(12) United States Patent
Iida et al.

(10) Patent No.: US 11,106,714 B2
(45) Date of Patent: Aug. 31, 2021

(54) SUMMARY GENERATING APPARATUS, SUMMARY GENERATING METHOD AND COMPUTER PROGRAM

(71) Applicant: National Institute of Information and Communications Technology, Tokyo (JP)

(72) Inventors: Ryu Iida, Tokyo (JP); Kentaro Torisawa, Tokyo (JP); Jonghoon Oh, Tokyo (JP); Canasai Kruengkrai, Tokyo (JP); Yoshihiko Asao, Tokyo (JP); Noriyuki Abe, Tokyo (JP); Junta Mizuno, Tokyo (JP); Julien Kloetzer, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 16/610,916

(22) PCT Filed: May 7, 2018

(86) PCT No.: PCT/JP2018/017606
§ 371 (c)(1),
(2) Date: Nov. 5, 2019

(87) PCT Pub. No.: WO2018/207723
PCT Pub. Date: Nov. 15, 2018

(65) Prior Publication Data
US 2020/0159755 A1    May 21, 2020

(30) Foreign Application Priority Data
May 8, 2017    (JP) .............................. JP2017-092146

(51) Int. Cl.
*G06F 16/34* (2019.01)
*G06F 40/30* (2020.01)
(Continued)

(52) U.S. Cl.
CPC ............ *G06F 16/345* (2019.01); *G06F 40/20* (2020.01); *G06F 40/268* (2020.01); *G06F 40/30* (2020.01); *G06N 3/08* (2013.01)

(58) Field of Classification Search
CPC ............................ G06F 16/345; G06F 40/268
See application file for complete search history.

(56) References Cited

U.S. PATENT DOCUMENTS

| | | | |
|---|---|---|---|
| 6,205,456 B1* | 3/2001 | Nakao | G06F 16/345 715/201 |
| 7,562,066 B2* | 7/2009 | Kawatani | G06F 16/3347 |

(Continued)

FOREIGN PATENT DOCUMENTS

JP    2011-221728 A    11/2011

OTHER PUBLICATIONS

International Search Report for corresponding International App. No. PCT/JP2018/017606, dated Jul. 17, 2018.
(Continued)

*Primary Examiner* — Scott T Baderman
*Assistant Examiner* — Mario M Velez-Lopez
(74) *Attorney, Agent, or Firm* — Renner, Otto, Boisselle & Sklar, LLP

(57) ABSTRACT

A summary generating apparatus includes a text storage device storing text with information indicating a portion to be focused on; word vector converters vectorizing each word of the text and adding an element indicating whether the word is focused on or not to the vector and thereby converting the text to a word vector sequence; an LSTM implemented by a neural network performing sequence-to- (Continued)

sequence type conversion, pre-trained by machine learning to output, in response to each of the word vectors of the word vector sequence input in a prescribed order, a summary of the text consisting of the words represented by the word sequence; and input units inputting each of the word vectors of the word vector sequence in the prescribed order to the neural network.

6 Claims, 17 Drawing Sheets

(51) Int. Cl.
G06F 40/268 (2020.01)
G06N 3/08 (2006.01)
G06F 40/20 (2020.01)

(56) References Cited

U.S. PATENT DOCUMENTS

| | | | | |
|---|---|---|---|---|
| 8,612,202 | B2 * | 12/2013 | Kawai | G06F 16/9558 |
| | | | | 704/1 |
| 10,146,751 | B1 * | 12/2018 | Zhang | G06F 16/313 |
| 10,402,495 | B1 * | 9/2019 | Rush | G10L 15/197 |
| 10,509,860 | B2 * | 12/2019 | Zhang | G06F 40/205 |
| 10,936,806 | B2 * | 3/2021 | Okamoto | G06F 40/211 |
| 2002/0111786 | A1 * | 8/2002 | Sugeno | G06F 40/30 |
| | | | | 704/1 |
| 2018/0033425 | A1 * | 2/2018 | Kikuchi | G06F 40/253 |
| 2018/0300400 | A1 * | 10/2018 | Paulus | G06F 40/58 |
| 2019/0362020 | A1 * | 11/2019 | Paulus | G06N 3/04 |
| 2020/0265192 | A1 * | 8/2020 | Lin | G06N 3/0454 |
| 2021/0110811 | A1 * | 4/2021 | Joseph | G10L 13/0335 |

OTHER PUBLICATIONS

Istvan Varga et al., "Aid is out there: Looking for help from tweets during a large scale disaster", In Proceedings of the 51st Annual Meeting of the Association for Computational Linguistics. Aug. 4-9, 2013. pp. 1619-1629 (discussed in specification).

Alexander M. Rush et al., "A Neural Attention Model for Abstractive Sentence Summarization", In Proceedings of the 2015 Conference on Empirical Methods in Natural Language Processing, ACL, pp. 379-389 (discussed in specificaiton).

S. Yoshioka et al., "Suggestion of multi-attention model for generated-type one sentence abstract", The 8th Forum on Data Engineering and Information Management (14th annual meeting of The Database Society of Japan), Mar. 2, 2016, pp. 2-3 (with Partial Machine Translation).

Minh-Thang Luong et al., "Effective Approaches to Attention-based Neural Machine Translation", In Proceedings of the 2015 Conference on Empirical Methods in Natural Language Processing, pp. 1412-1421, Sep. 17-21, 2015.

* cited by examiner

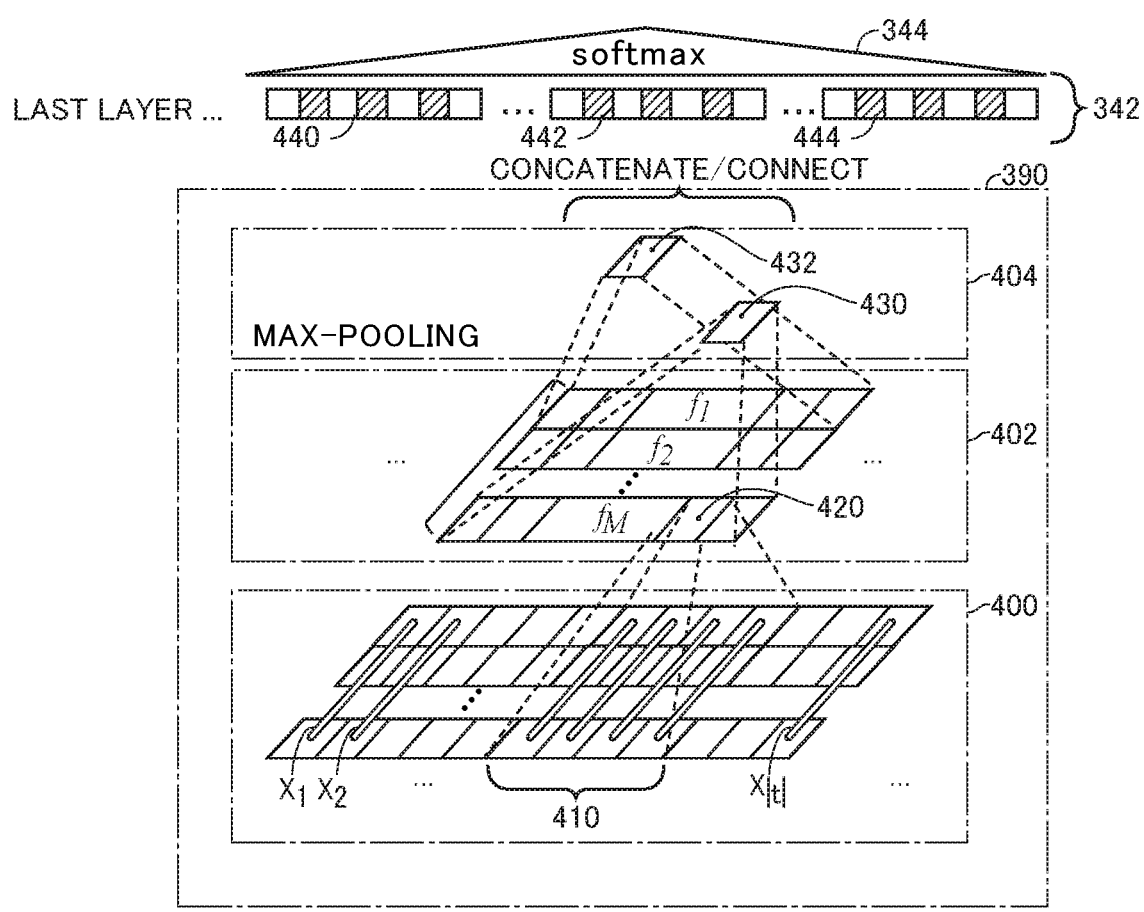

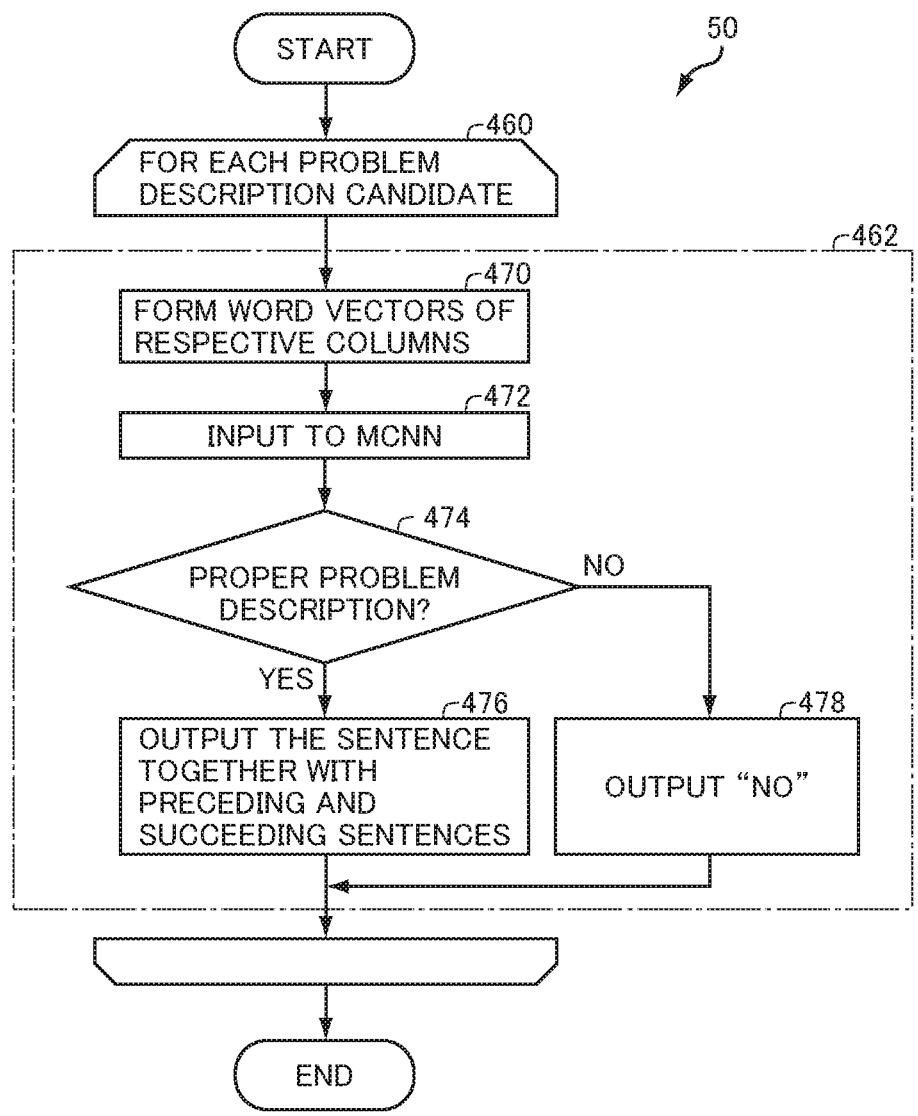

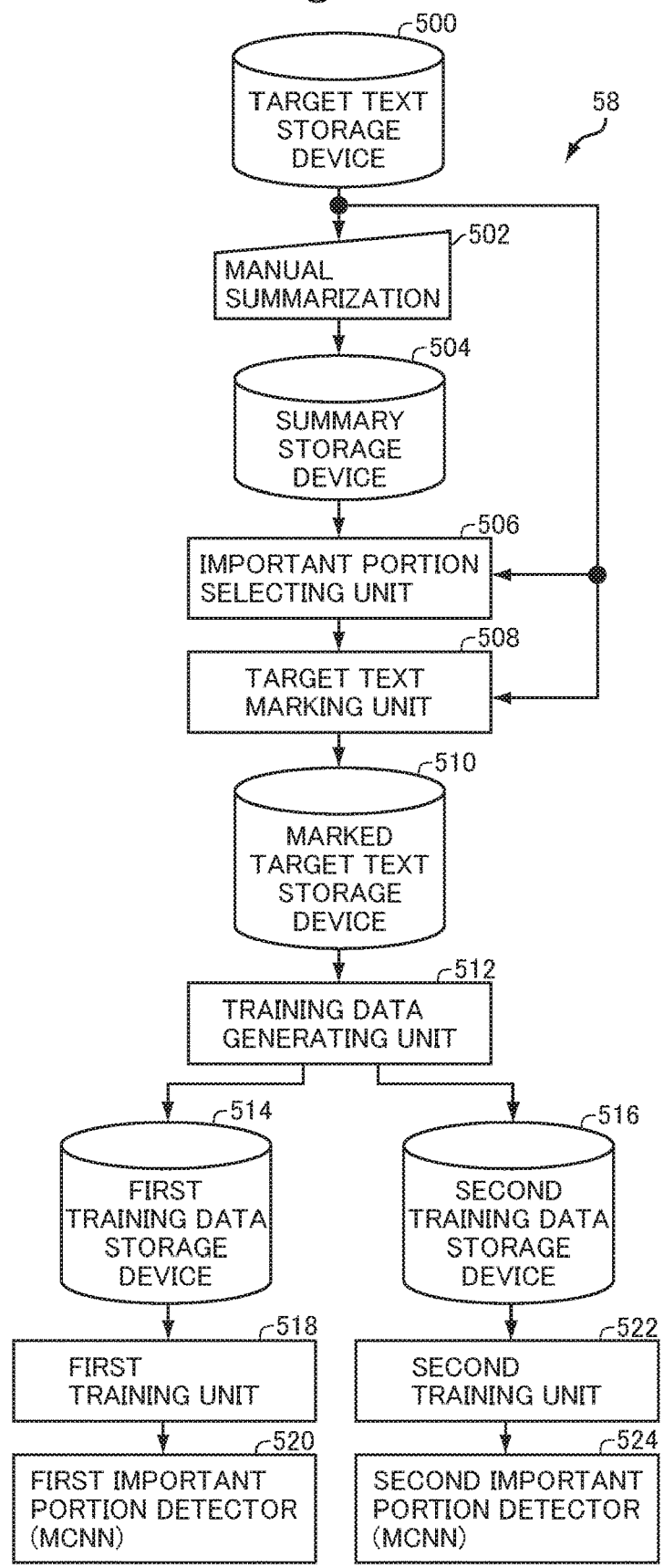

(AFTER THE EARTHQUAKE, 2003 DISASTER VICTIMS IN THE CITY MOVED TO WELFARE FACILITIES. AS OF APRIL 1, ONE HUNDRED AND TEN VICTIMS WHO ARE UNABLE TO REBUILD THEIR HOMES OR WHO HAVE NO PLACE TO GO ARE LEFT IN THE WELFARE FACILITIES. NOT ONLY FUJIE-SAN BUT MANY OTHER ELDERLY PERSONS CANNOT RETURN TO THEIR PLACES FOR THE REST OF THEIR LIVES.)

532
震災後4月1日現在、引き取り手がない110人が老人福祉施設に残っていること

(AFTER THE EARTHQUAKE, AS OF APRIL 1, ONE HUNDRED AND TEN VICTIMS WHO HAVE NO PLACE TO GO ARE LEFT IN THE WELFARE FACILITIES.)

4月1日現在、自宅再建が出来ない、引き取り手がない110人が施設に残っていること

(AS OF APRIL 1, ONE HUNDRED AND TEN VICTIMS WHO ARE UNABLE TO REBUILD THEIR HOMES OR WHO HAVE NO PLACE TO GO ARE LEFT IN THE WELFARE FACILITIES.)

被災者110人が老人福祉施設に残っていること

(ONE HUNDRED AND TEN VICTIMS ARE LEFT IN THE WELFARE FACILITIES.)

536

538
震災後、同市内の被災者2003人が老人福祉施設に移った。4月1日現在、自宅再建が出来なかったり、引き取り手がない110人が施設に残っている。死ななければ、戻れないお年寄りはふじゑさんだけではない。

(AFTER THE EARTHQUAKE, TWO THOUSAND AND THRE DISASTER VICTIMS IN THE CITY MOVED TO WELFARE FACILITIES. AS OF APRIL 1, ONE HUNDRED VICTIMS WHO ARE UNABLE TO REBUILD THEIR HOMES OR WHO HAVE NO PLACE TO GO ARE LEFT IN THE WELFARE FACILITIES. NOT ONLY FUJIE-SAN BUT MANY OTHER ELDERLY PERSONS CANNOT RETURN TO THEIR PLACES FOR THE REST OF THEIR LIVES.)

SUMMARY GENERATING APPARATUS, SUMMARY GENERATING METHOD AND COMPUTER PROGRAM

TECHNICAL FIELD

The present invention relates to fields of artificial intelligence and natural language processing and, more specifically, to an apparatus that automatically generates a summary of texts based on a description related to a specific element such as a problem, appearing in the texts, as well as to a training device for the apparatus.

BACKGROUND ART

A technique of detecting a portion describing a problem (problem description) described in a text and a technique of summarizing the text focusing on the problem description detected thereby are essential techniques to realize specific social application of artificial intelligence (AI) that is expected to develop in the near future, including automatic detection of social problems and presentation of their solutions by AI. Existing techniques of automatic problem detection, however, are not good enough for practical use. Further, techniques for automatic summarization do not provide summaries of sufficient quality, as processes for appropriately summarizing targets are immature.

Non-Patent Literature 1 listed below discloses a technique in which various language resources, including a semantic class dictionary of nouns, a positive/negative polarity dictionary of words, a trouble noun dictionary, and an excitatory/inhibitory dictionary, are employed to utilize features related to problem candidate expressions as objects during training in machine learning, and using a model obtained thereby, a problem description is automatically detected. According to this conventional method, <noun, particle, predicate> in texts are objects to be classified. At the time of classification, clues such as whether a noun to be classified is a positive noun or a negative noun (whether it is a non-trouble noun or a trouble noun), and whether <particle, predicate> to be classified is excitatory or inhibitory, are manually selected based on an excitation dictionary to utilize such features. However, manual selection and listing of such features have limitations, and it is difficult, even with a machine learning algorithm of high generalization performance such as SVM (Support Vector Machine), to estimate weights of various and many listed features with limited amount of training data.

On the other hand, in connection with automatic summarization, the abstracting-type summarization, which have been technically difficult, i.e., techniques of "generating" a summary as natural sentences rather than extracting sentences, has been developed along with the advance of neural networks (see Non-Patent Literature 2 listed below). It is noted, however, that such automatic summarization techniques, which are referred to as general summarization, generate summaries without focusing on specific contents in the texts. Therefore, using such existing techniques, it is difficult to summarize texts focusing on a specific element (for example, problem description) in the texts.

CITATION LIST

Non Patent Literature

NPL 1: Istvan Varga, Motoki Sano, Kentaro Torisawa, Chikara Hashimoto, Kiyonori Ohtake, Takao Kawai, Jong-Hoon Oh, and Stijn De Saeger. 2013. Aid is out there: Looking for help from tweets during a large scale disaster. In Proceedings of the 51st Annual Meeting of the Association for Computational Linguistics. pages 1619-1629.

NPL 2: Alexander M. Rush, Sumit Chopra, and Jason Weston. 2015. A neural attention model for abstractive sentence summarization. In Proceedings of the 2015 Conference on Empirical Methods in Natural Language Processing. pages 379-389.

SUMMARY OF INVENTION

Technical Problem

Therefore, a goal of the present invention is to provide a technique of automatically detecting, with high precision, a particularly description to be focused on, such as a problem description, appearing in texts and automatically summarizing the texts while focusing on the detected description.

Solution to Problem

According to a first aspect, the present invention provides a summary generating apparatus generating a summary of text, including: a text storage device storing the text with information indicating the portion to be focused on in the text; a word vector converting means for vectorizing each word of the text by a predetermined method and adding an element indicating whether or not the word is the portion to be focused on to the vector, thereby converting the text to a word vector sequence; a summarizing means implemented by a neural network performing sequence-to-sequence type conversion, trained beforehand by machine learning such that it outputs, in response to input of each of the word vectors of the word vector sequence in a prescribed order, a summary of the text consisting of words represented by the word vector sequence; and an input means for inputting each of the word vectors of the word vector sequence converted by the word vector converting means to the neural network in the prescribed order.

Preferably, the text storage device is capable of storing, together with the text, information indicating the portions to be focused on in the text.

More preferably, the neural network is a recurrent neural network.

More preferably, the neural network is an LSTM (Long Short-Term Memory).

According to a second aspect, the present invention provides a summary generating method that generates a summary of text using a computer, including the steps of: the computer storing the text with information indicating a portion to be focused on in the text in a text storage device; the computer vectorizing each word of the text stored in the text storage device by a predetermined method and adding an element indicating whether or not the word is the portion to be focused on to the vector, thereby converting the text to a word vector sequence; the computer calling a summarizing program implemented by a neural network performing sequence-to-sequence type conversion, trained beforehand by machine learning such that it outputs, in response to input of each of word vectors of the word vector sequence in a prescribed order, a summary of the text consisting of words represented by the word vector sequence; and the computer inputting each of the word vectors of the word vector sequence to the neural network in the prescribed order, and obtaining a word sequence output by the neural network in response to the input, as a summary of the text.

According to a third aspect, the present invention provides a computer program that makes a computer function as various means of any of the apparatuses described above.

BRIEF DESCRIPTION OF DRAWINGS

FIG. 9 is a schematic illustration showing a principle of MCNN operation.

FIG. 10 is a flowchart representing control structure of a computer program realizing the problem description discriminator shown in FIG. 1.

FIG. 11 is a flowchart representing control structure of a computer program realizing an important portion extractor MCNN training unit 58 shown in FIG. 1.

FIG. 12 is a schematic illustration showing a process of extracting important portions from manually created summaries.

DESCRIPTION OF EMBODIMENTS

Figure 1:
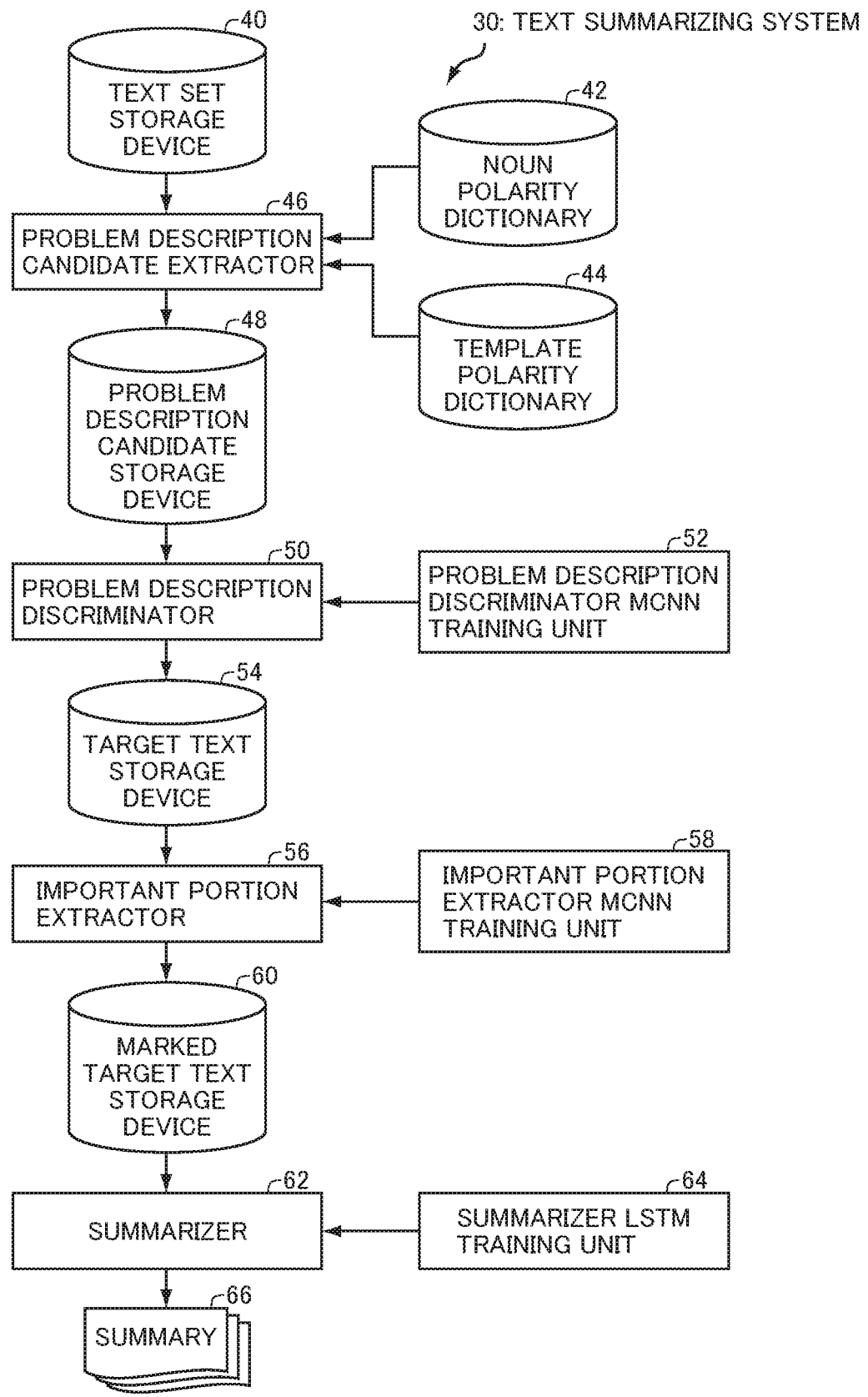
FIG. 1 is a block diagram illustrating an overall configuration and training process of the text summarizing system in accordance with a first embodiment of the present invention.

In the following description and in the drawings, the same components are denoted by the same reference characters. Therefore, detailed description thereof will not be repeated. In the following embodiments, a portion describing a problem (problem description) and a portion considered to be important from the viewpoint of the problem described at that portion are regarded as portions to be focused on.

First Embodiment

<Configuration>

Referring to FIG. 1, a text summarizing system 30 in accordance with a first embodiment as will be described below extracts, by using a problem description candidate extractor 46, which extracts candidates of portions describing problems (problem description candidates) included in texts stored in a text set storage device 40, and then discriminates, by using a problem description discriminator 50, which is an MCNN that judges whether or not each problem description candidate really describes a problem. MCNN will be described later. In the present embodiment, a problem description is detected as a specific element and a summary is generated based thereon. The present invention, however, is not limited to such an embodiment. Any specific element that can be detected by various methods may be used as a basis for generating a summary.

Problem description candidate extractor 46 detects a problem description candidate by using a noun polarity dictionary 42 that stores information (polarity) indicating whether or not a noun means some trouble, and a template polarity dictionary 44 that stores language units referred to as predicate templates, each consisting of a particle and a predicate to be combined with a noun, together with their polarities. In the present embodiment, if a noun means a trouble, it has a negative polarity, and if not, it has a positive polarity. A predicate template is connected to a noun and forms a phrase. An excitatory value that indicates orientation and magnitude of excitation in accordance with classification of excitatory and inhibitory can be added to a predicate template. An excitatory predicate template entails that the function or effect of the entity referred to by a noun combined with the predicate template is activated or enhanced. An inhibitory predicate template entails that the function or effect of the entity referred to by a noun combined with the predicate template is deactivated or suppressed. Whether a predicate template is excitatory or inhibitory is referred to as a polarity of the predicate template. In the present specification, excitatory polarity will be referred to as positive polarity and inhibitory polarity as negative polarity. From the foregoing, if a noun of positive polarity is combined with a predicate template of negative polarity, or if a noun of negative polarity is combined with a predicate of positive polarity, the combination is highly likely to represent a problem. As such, problem description candidate extractor 46 then extracts problem description candidates by utilizing the polarities of nouns and predicate templates.

It is noted, however, that a problem description candidate extracted in this manner does not always describe a problem properly. In order to improve the accuracy of problem detection, in the present embodiment, whether a problem description portion truly describes a problem or not is discriminated by problem description discriminator 50. As described above, problem description discriminator 50 uses an MCNN. Therefore, problem description discriminator 50 is trained beforehand using a problem description discriminator MCNN training unit 52.

Text summarizing system 30 further includes: a target text storage device 54 that stores texts to be summarized, in which a portion discriminated highly likely to be a problem description by problem description discriminator 50 is specified; an important portion extractor 56; an important portion extractor MCNN training unit 58 that trains the important portion extractor 56; a marked target text storage device 60 that stores target texts with important portions marked by important portion extractor 56; a summarizer 62 that generates a summary of a marked target text stored in marked target text storage device 60 by using an LSTM and outputs it as a summary 66; and a summarizer LSTM training unit 64 that trains the LSTM as the essential part of summarizer 62. An LSTM is a recurrent neural network and, as will be described later, it is used, by way of example, for estimation involving sequence-to-sequence type conversion.

Figure 2:
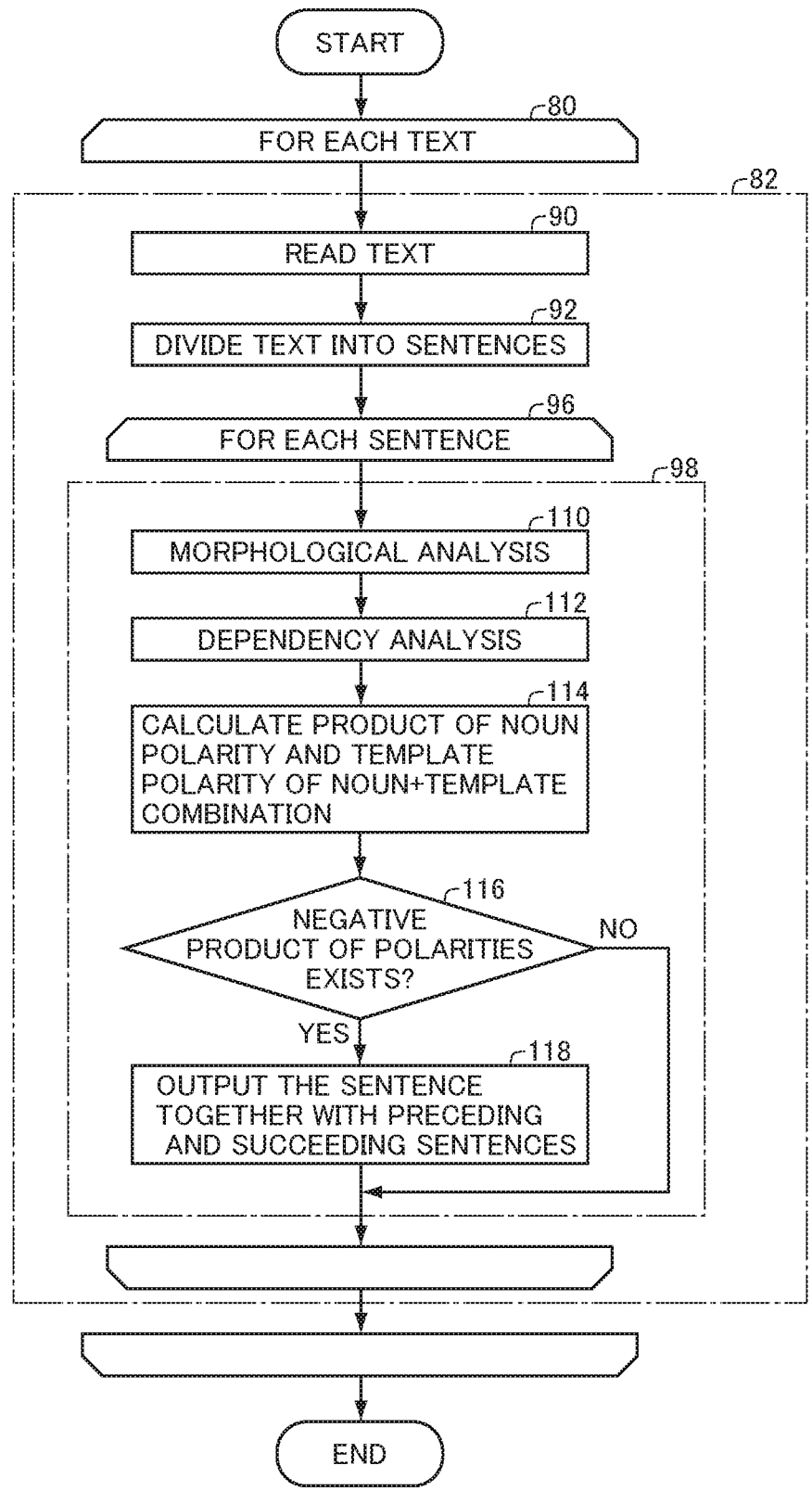
FIG. 2 is a flowchart representing a control structure of a computer program realizing a problem description candidate extractor of the text summarizing system shown in FIG. 1.

FIG. 2 shows, in the form of a flowchart, a control structure of a computer program realizing problem description candidate extractor 46. The program is also used when a summary is generated by text summarizing system 30 and when the problem description discriminator 50 is trained. Referring to FIG. 2, the program includes a step 80 of executing, for each text stored in text set storage device 40, a process 82 of detecting problem description candidates.

The process 82 includes: a step 90 of reading a target text from the storage device; a step 92 of dividing the read text into sentences using punctuation marks; and a step 96 of executing, for each sentence of the target text, a process 98 of searching for a problem description candidate.

The process 98 includes: a step 110 of performing morphological analysis of the text; a step 112 of performing dependency analysis of the text; a step 114 of calculating, with reference to noun polarity dictionary 42 and template polarity dictionary 44, a product of polarities of each combination of a noun and a predicate template having a dependency relation, among the texts that have been subjected to dependency analysis; a step 116 of determining whether there is any negative product; and a step 118 of outputting, if the determination is positive (that is, if there is any negative product), a total of three sentences including the sentence as the object and preceding and succeeding sentences, as a target text candidate.

Figure 3:
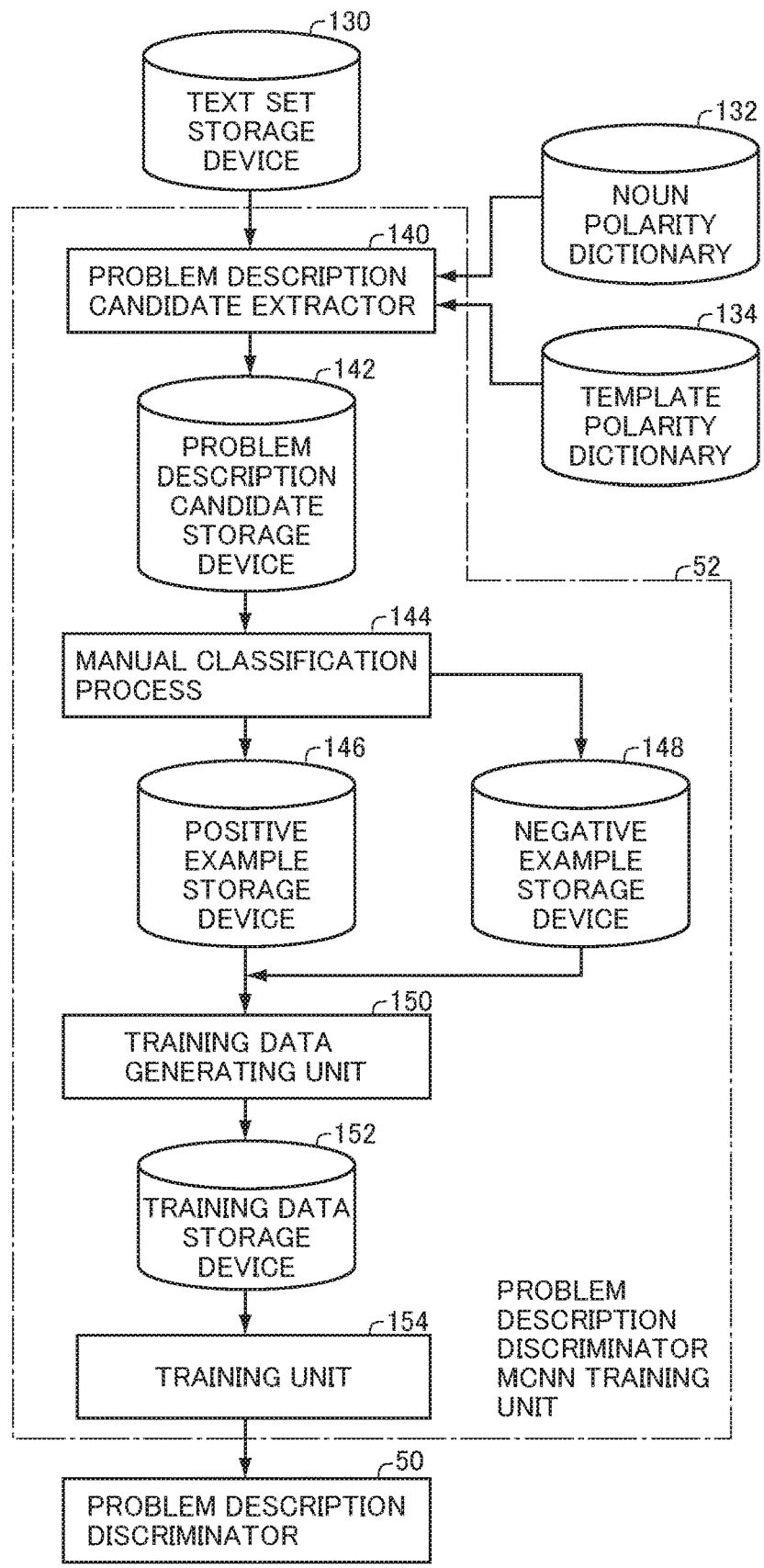
FIG. 3 is a block diagram schematically showing a configuration of a training unit of a Multi-column Convolutional Neural Network (MCNN) included in a problem description discriminator of the text summarizing system shown in FIG. 1.

FIG. 3 is a block diagram showing a configuration of problem description discriminator MCNN training unit 52 shown in FIG. 1 with other resources used for training. Referring to FIG. 3, problem description discriminator MCNN training unit 52 trains MCNN included in problem description discriminator 50 using text set storage device 130 storing a set of texts including a huge number of texts for training, and a noun polarity dictionary 132 and a template polarity dictionary 134, which are the same as the noun polarity dictionary 42 and template polarity dictionary 44 shown in FIG. 1.

Problem description discriminator MCNN training unit 52 includes: a problem description candidate extractor 140 that extracts, from the texts stored in text set storage device 130, those considered to be problem description candidates with reference to noun polarity dictionary 132 and template polarity dictionary 134, and outputs three sentences including the sentence having the portion of interest and preceding and succeeding sentences as a problem description candidate; and a problem description candidate storage device 142 storing sentences extracted by problem description candidate extractor 140. Problem description discriminator MCNN training unit 52 further includes: a positive example storage device 146 for storing those of the problem description candidates stored in problem description candidate storage device 142 which are discriminated to be proper problem description portions through manual classification process 144 as positive examples for training; and a negative example storage device 148 for storing those which are discriminated to be improper problem description portions as negative examples for training.

Problem description discriminator MCNN training unit 52 further includes: a training data generating unit 150 for generating training data for problem description discriminator 50 from the positive and negative examples stored in positive example storage device 146 and negative example storage device 148; a training data storage device 152 for storing training data generated by training data generating unit 150; and a training unit 154 for training problem description discriminator 50 using the training data stored in training data storage device 152.

Figure 4:
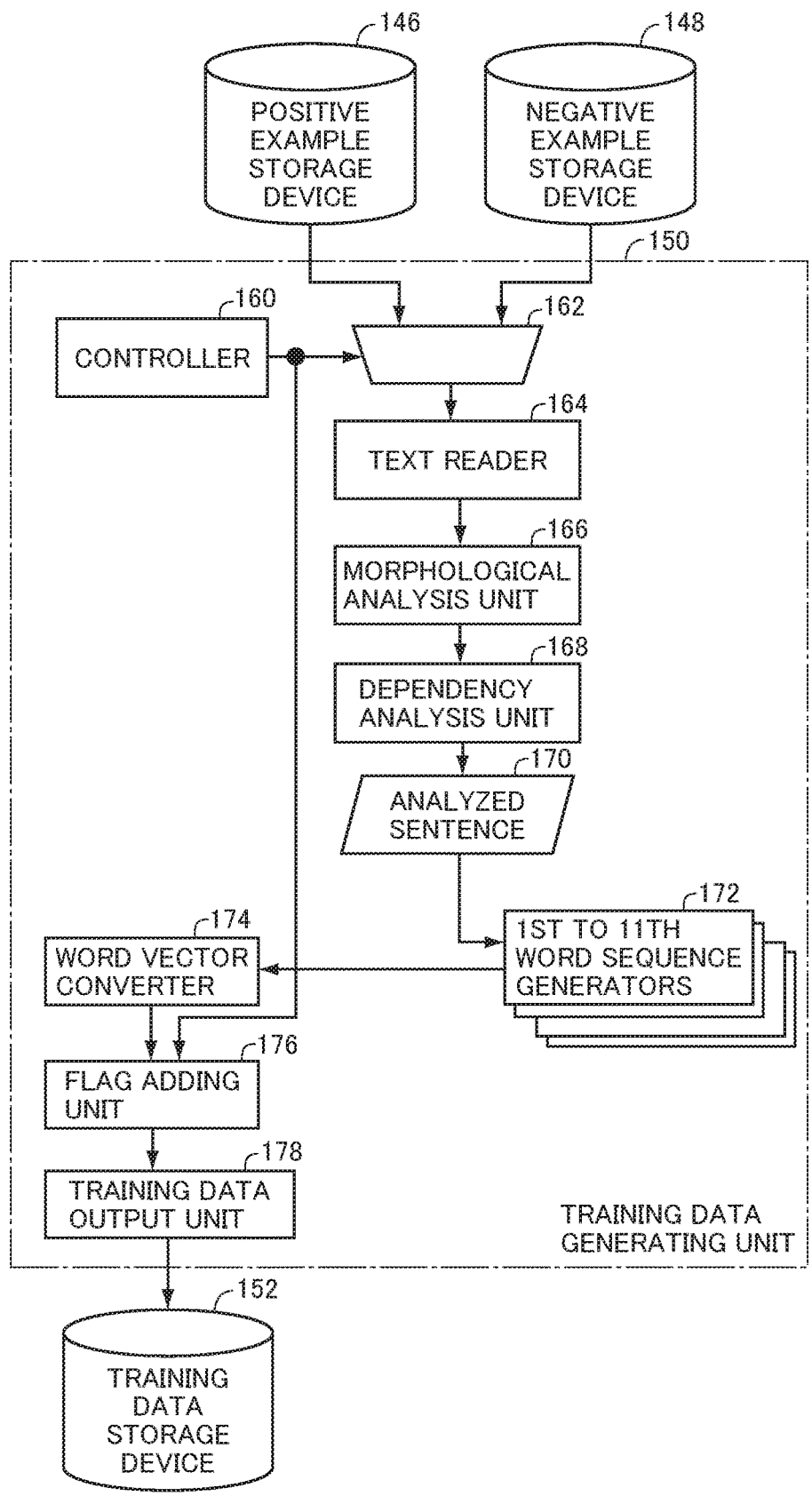
FIG. 4 is a block diagram showing a configuration of a training data generating unit shown in FIG. 3.

FIG. 4 is a block diagram showing a more detailed configuration of training data generating unit 150 shown in FIG. 3. Referring to FIG. 4, training data generating unit 150 includes: a controller 160 for switching generation of training data using positive examples and negative examples; a selector 162 for switching text reading destination between positive example storage device 146 and negative example storage device 148 under the control of controller 160; a text reader 164 for reading texts one by one in order from the positive example storage device 146 or the negative example storage device 148 through selector 162; a morphological analysis unit 166 for performing morphological analysis on the text read by text reader 164; and a dependency analysis unit 168 for performing dependency analysis on the text in which morphological analysis is performed by morphological analysis unit 166 and outputting an analyzed sentence 170 having dependency information added.

Training data generating unit 150 further includes: first to eleventh word sequence generators 172 for generating eleven word sequences as inputs to be given to MCNN columns (eleven columns, as will be described later) included in problem description discriminator 50, from word sequences forming the analyzed sentence 170; a word vector converter 174 for converting eleven word sequences generated by the first to eleventh word sequence generators 172 to word vector sequences, respectively; a flag adding unit 176 for adding, to each of the eleven word vector sequences output from word vector converter 174 for a certain input text, a flag of a value indicating a positive example when the text is from the positive example storage device 146 and a flag of a value indicating a negative example when it is from the negative example storage device 148, and thereby generating training data; and a training data output unit 178 for outputting, as a set of training data, a group of word vectors having flags added output from flag adding unit 176, to training data storage device 152. As the flags added by flag adding unit 176 to the group of word vectors, values used by controller 160 for controlling selector 162 may be used directly.

Word sequences as inputs to MCNN are as follows. In the table below, TNP stands for a bunsetsu phrase including a noun of a problem description candidate included in the problem description candidate, and PRED stands for a bunsetsu phrase including a predicate of a predicate template included in the problem description candidate.

TABLE 1

| Type | column No. | Word Sequence (Column Input) |
|---|---|---|
| Base | 1 | Word sequence of TNP and PRED |
| SurfSeq | 2 | Word sequence that appears before TNP |
| | 3 | Word sequence that appears between TNP and PRED |
| | 4 | Word sequence that appears after PRED |
| DepTree | 5 | Word sequence in the dependency path between TNP and PRED |
| | 6 | Word sequence in the partial dependency tree on which PRED depends |
| | 7 | Word sequence in the partial dependency tree depending on TNP |
| | 8 | Word sequence that is not included in the columns 1, 5, 6 and 7 |
| PredContext | 9 | Word sequence of PRED |
| | 10 | Word sequence that appears before PRED |
| | 11 | Word sequence that appears after PRED |

Each of these word sequences is extracted from the whole sentence. In the present embodiment, the target text to be summarized contains three sentences. Therefore, TNP and PRED do not always appear in the same sentences. In the present embodiment, in order to extract the above-described word sequences even in cases where TNP and PRED do not appear in the same sentence, dependency tree roots of three sentences are connected to each other at a virtual root node and the word sequences above are obtained by using one dependency tree.

The first word sequence generator extracts a word sequence from a noun-predicate pair included in a problem description candidate, and outputs it as a Base word sequence. From this word sequence, word vector converter 174 shown in FIG. 4 generates Base vector sequence, which is a word vector sequence. In the present embodiment, in order to maintain the order of appearance of words and to reduce amount of computation, word embedding vectors are used as all the word vectors as will be discussed in the following.

Figure 5:
FIG. 5 is a schematic illustration showing a word sequence used for identifying a problem description, an important portion and the like in texts, in accordance with an embodiment of the present invention.

Referring to FIG. 5, of word sequence generators 172, word sequences extracted by the second to fourth word sequence generators include, based on the order of appearance of word sequences in a sentence 200, a word sequence 260 from the sentence beginning to a bunsetsu phrase 250 that includes a noun in the target problem description candidate, a word sequence 262 between bunsetsu phrase 250 and a predicate 202, and a word sequence 264 after predicate 202 to the sentence end. Therefore, the SurfSeq vector sequence is obtained as three word embedding vector sequences.

Figure 6:
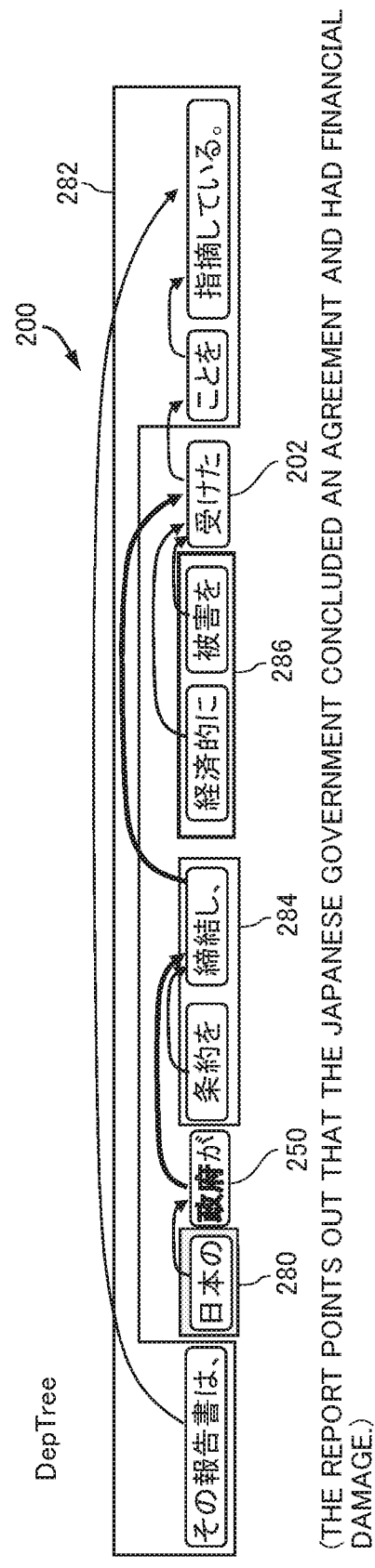
FIG. 6 is a schematic illustration showing another word sequence used for identifying a problem description, an important portion and the like in texts, in accordance with an embodiment of the present invention.

Referring to FIG. 6, the word sequences extracted by the fifth to eighth word sequence generators of the word sequence generators 172 based on a dependency tree of sentence 200 include word sequences obtained respectively from a partial tree 280 related to bunsetsu phrase 250 including a noun of problem description candidate, a partial tree 282 as a dependent of predicate 202, a dependency path 284 between bunsetsu phrase 250 and predicate 202, and others 286. Therefore, in this example, the DepTree vector sequence is obtained as four word embedding vector sequences.

Figure 7:
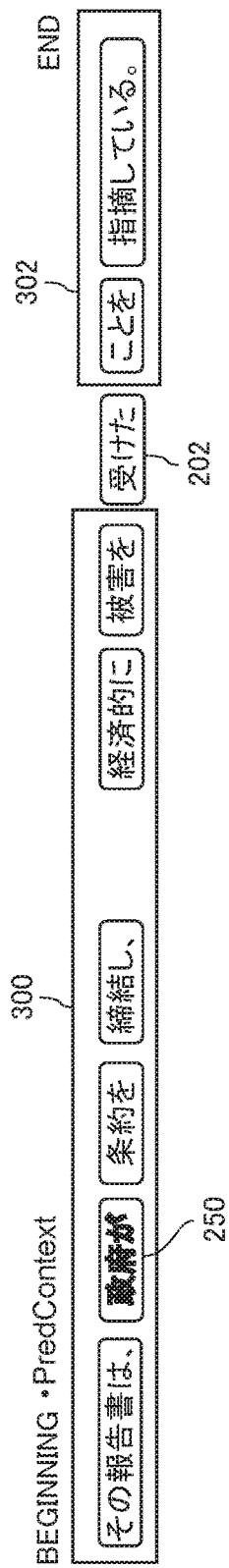
FIG. 7 is a schematic illustration showing still another word sequence used for identifying a problem description, an important portion and the like in texts, in accordance with an embodiment of the present invention.

Referring to FIG. 7, of the word sequence generators 172, word sequences extracted by the ninth to eleventh word sequence generators include, in sentence 200, a word sequence 300 preceding and a word sequence 302 succeeding a predicate 202. Therefore, in this example, the Pred-Context vector sequence is obtained as two word embedding vector sequences.

Figure 8:
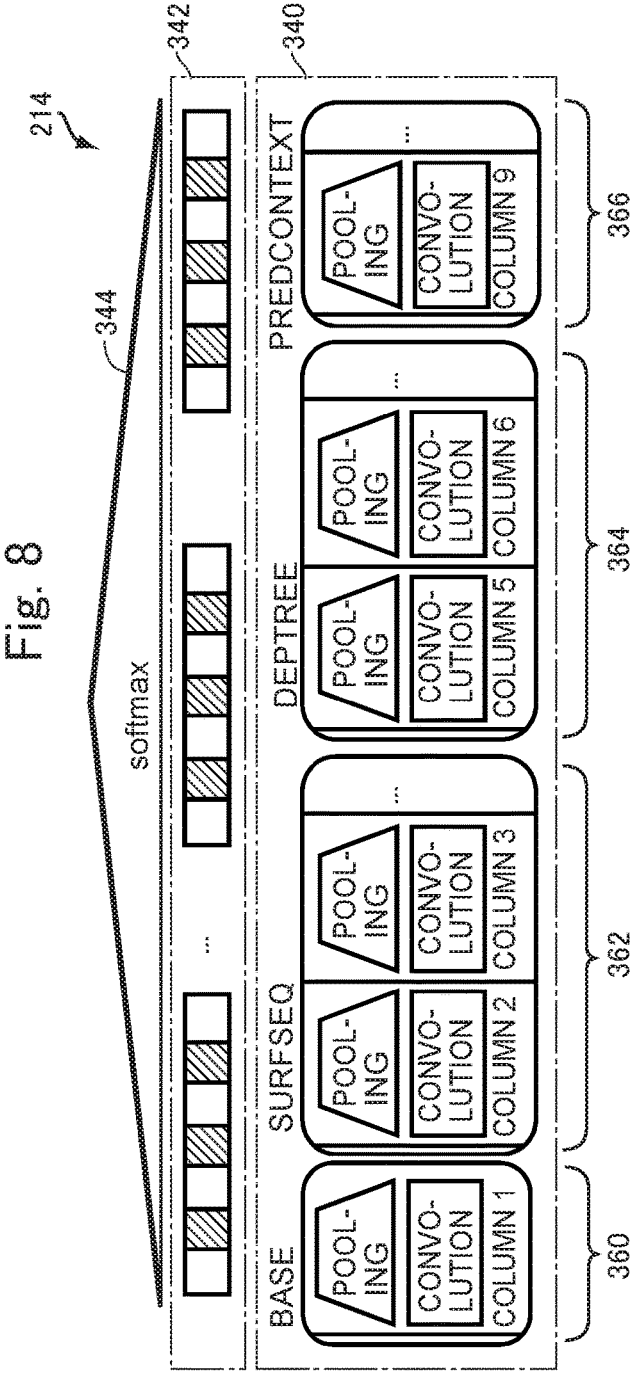
FIG. 8 schematically shows an architecture of an MCNN identifying a problem description, an important portion and the like using a word vector sequence as an input, in accordance with an embodiment of the present invention.

Referring to FIG. 8, in the present embodiment, MCNN 214 implementing problem description discriminator 50 includes a neural network layer 340 consisting of first to fourth convolutional neural network groups 360, 362, 364 and 366; a concatenating layer 342 linearly concatenating outputs of respective neural networks in neural network layer 340; and a softmax layer 344 for judging whether or not a problem description candidate is a proper problem description by the score between 0 to 1 by applying softmax function to a vector output from concatenating layer 342, and for outputting the result.

The first convolutional neural network group 360 includes a first column of sub-network receiving the Base vector. The second convolutional neural network group 362 includes the second, third and fourth columns of sub-networks receiving three SurfSeq vector sequences, respectively. The third convolutional neural network group 364 includes the fifth, sixth, seventh and eighth columns of sub-networks receiving four DepTree vector sequences, respectively. The fourth convolutional neural network group 366 includes the ninth and tenth columns of sub-networks receiving two PredContext vector sequences. These sub-networks are all convolutional neural networks.

Outputs of neural network layer 340 are simply concatenated in the concatenating layer 342 to be used as an input vector to softmax layer 344.

Functions of MCNN 214 will be described in greater detail. FIG. 9 shows, as a representative, a convolutional neural network 390. Here, for easier description, it is assumed that convolutional neural network 390 consists simply of an input layer 400, a convolutional layer 402 and a pooling layer 404, while the network may consist of a plurality of sets of these three layers.

In training, word vector sequences $X_1, X_2, \ldots, X_{|t|}$, each of which is an instance in training data and is converted by word vector converter 174, are given to input layer 400 as an input. The word vector sequences $X_1, X_2, \ldots, X_{|t|}$ are represented as a matrix $T=[X_1, X_2, \ldots, X_{|t|}]^T$. To the matrix T, M feature maps are applied. The feature map is a vector and a vector O, an element of each feature map, is computed by applying a filter represented by $f_j$ ($1 \leq j \leq M$) to an N-gram comprised of consecutive word vectors, while shifting N-gram 410. N is an arbitrary natural number, which is N=3 in this embodiment. Specifically, O is given by the equation below.

$$O = f(W_{fj} \cdot x_{ij:N-1} + b_{ij})$$

where · represents elementwise multiplication followed by summation of the results, and f(x)=max (0, x) (normalized linear function). Further, if the number of elements of word vector is d, weight $W_{fj}$ is a real matrix of d×N dimensions, and bias $b_{ij}$ is a real number.

It is noted that N may be the same for the entire feature maps or N may be different for some feature maps. Relevant value of N may be something like 2, 3, 4 or 5. In the present embodiment, all convolutional neural networks in a column set have the same weight matrices. Though the weight matrices may be different, the accuracy becomes higher when they are equal in comparison with the accuracy when different weight matrices are trained independently. Any filter may be used for the convolutional neural networks. A filter for image processing may be used.

For each feature map, the subsequent pooling layer 404 performs so-called max pooling. Specifically, pooling layer 404 selects, from elements of feature map $f_M$, for example, the maximum element 420 and takes it out as an element 430. By performing this process on each of the feature maps, elements 432, . . . , 430 are taken out, and these are concatenated in the order of $f_1$ to $f_M$ and output as a vector 442 to concatenating layer 342. Vectors 440, . . . , 442, . . . , 444 obtained in this manner from respective convolutional neural networks are output to concatenating layer 342. Concatenating layer 342 simply concatenates vectors 440, . . . , 442, . . . , 444 linearly and applies the result to softmax layer 344. Regarding pooling layer 404, one that performs max-pooling is said to have a higher accuracy than one that adopts average-pooling. It is possible, however, to adopt average-pooling, or other type of pooling technique may be used if that well represents characteristics of the lower layer.

The training data contains the eleven types of word vector sequences described above and flags indicating whether the text, from which the word vector sequences are extracted, is a positive or negative example. During training, to the columns of MCNN 214, input vectors to respective columns are applied, an output of MCNN 214 is compared with the flag of the text, and each of the weights and biases forming MCNN 214 are adjusted to reduce the value of the error function by general back propagation.

Referring to FIG. 10, the computer program realizing problem description discriminator 50 except for the MCNN includes a step 460 of executing the following process 462 on each of the problem description candidates of texts stored in text set storage device 40. It is noted that prior to this process, morphological analysis and dependency analysis are performed for the text.

The process 462 includes: a step 470 of forming word vector sequences as inputs to the eleven columns shown in Table 1 above; a step 472 of inputting the eleven vector sequences obtained at step 470 to MCNN 214 and obtaining an output from MCNN 214; a step 474 of determining, from the output of MCNN 214, whether or not the target problem description candidate is a proper problem description and branching the flow of control depending on the result of the determination; a step 476, executed if the determination at step 474 is positive (if it is a proper problem description), of outputting three sentences, that is, the sentence including the problem description candidate and preceding and succeeding sentences, as the target text, and ending the process 462; and a step 478, executed if the determination at step 474 is NO, of outputting information that the problem description candidate is improper and ending the process 462.

Referring to FIG. 11, important portion extractor MCNN training unit 58 for training important portion extractor 56 includes: a target text storage device 500 for storing target texts for training; manual summarization 502 for manually summarizing each of the target texts stored in target text storage device 500; and a summary storage device 504 for storing the generated summaries. While three annotators manually create three summaries of one target text in the present embodiment, larger number of summaries may be created.

Important portion extractor MCNN training unit 58 further includes: an important portion selecting unit 506 for selecting, as an important portion, a word that is commonly included in at least two summaries created by the three annotators for each target text; a target text marking unit 508 marking the word selected by important portion selecting unit 506 as an important portion of each target text and outputting marked target text; a marked target text storage device 510 for storing the marked target text output from target text marking unit 508; and a training data generating unit 512 for reading marked target text from marked target text storage device 510, generating training data in accordance with the positional relation between the important portion and the predicate template in the problem description in the text and outputting the training data either to the first training data storage device 514 or to the second training data storage device 516.

When the training data is to be generated, if the predicate template in the problem description in the text and the important portion are both related to word vector generation, the training data have to be generated in different manners depending on their positional relation. In the present embodiment, while word vectors are basically generated based on the same approach as shown in Table 1, the details are changed as described below. Specifically, an important portion or its candidate is indicated by CAND. If CAND appears before PRED in a marked target text, TNP in Table 1 is replaced by CAND (first method). If PRED appears before CAND, in Table 1, the positions of CAND and PRED are switched (second method). In the present embodiment, during generation of training data, if CAND appears before PRED, the training data is generated by the first method and output to the first training data storage device 514 and in the opposite case, the training data is generated by the second method and output to the second training data storage device 516.

Important portion extractor MCNN training unit 58 further includes: a first training unit 518 for training a first important portion detector 520 including MCNN using the training data stored in the first training data storage device 514; and a second training unit 522 for training a second important portion detector 524 including MCNN using the training data stored in the second training data storage device 516.

The function of important portion selecting unit 506 will be described with reference to FIG. 12. Assume that three annotators independently create summaries 532, 534 and 536 for target text 530. Important portion selecting unit 506 extracts content words from each of these three summaries, and any content word that is used in two or more of them is selected as an important portion. By way of example, in FIG. 12, content words "as of April 1," "One hundred and ten victims who have no place to go" and "welfare facilities" are used in two summaries. Further, the words "are left" appear commonly in all three summaries. Therefore, these four portions are extracted as important portions and marked target text 538 having these portions marked as important portions is generated.

After the important words are extracted in this manner, training data is generated treating the portions where the important word or words are used in the target text 530 as positive examples and other portions as negative examples.

Manual preparation of summaries must be done carefully to serve the purpose described above. Various constraints may be necessary. For example, when creating a summary, it is preferred to initially form a new document by copying words that seem important in the target text and to add appropriate functional words. Limitations such as not to use any words that do not appear in the original text, to determine number of words to be used, for example up to forty, or to finish the summary in the same format, may be introduced.

Figure 13:
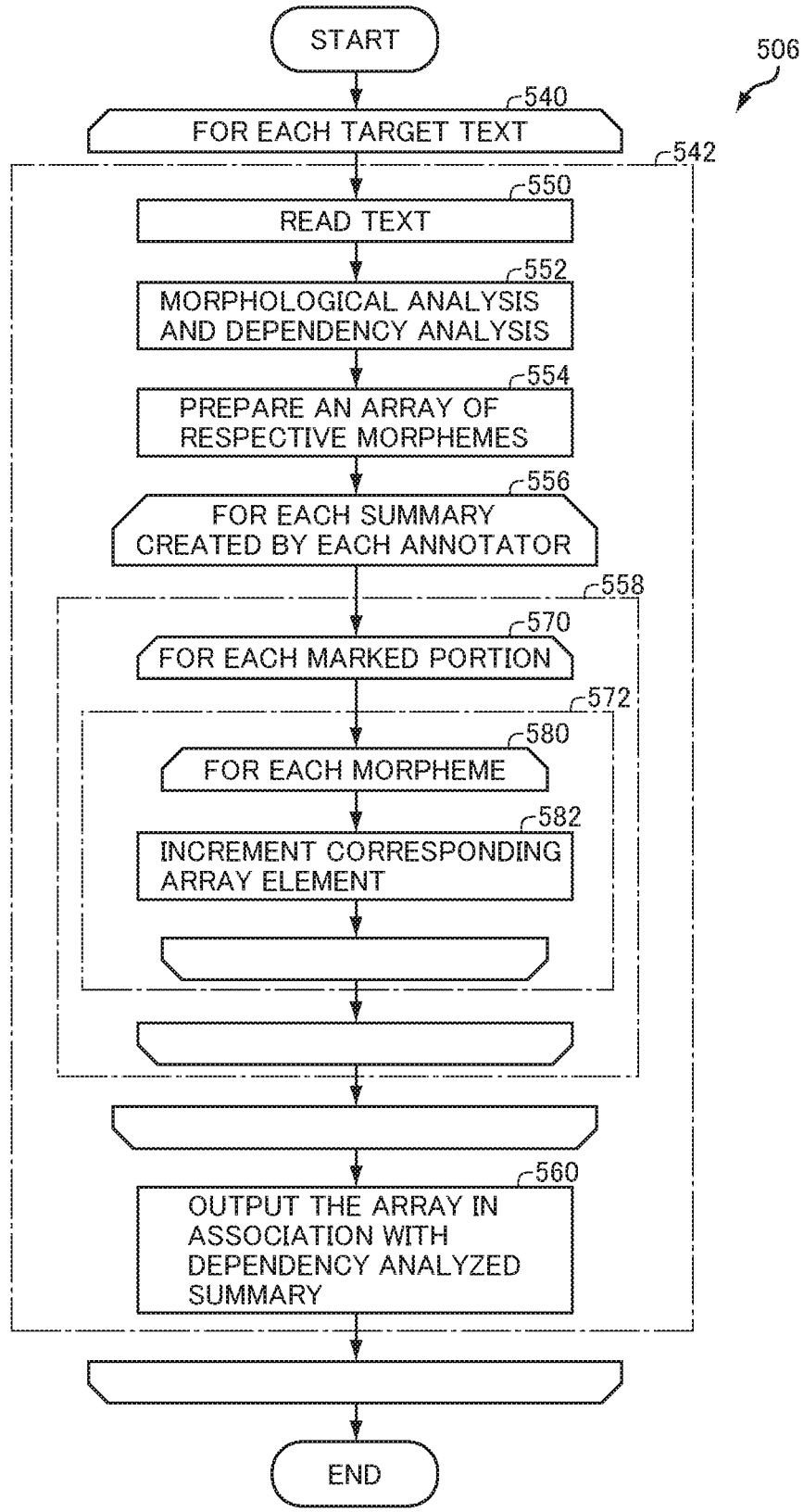
FIG. 13 is a flowchart representing a control structure of a computer program realizing the important portion selecting unit shown in FIG. 11.

FIG. 13 is a flowchart representing a control structure of a computer program realizing the important portion selecting unit 506 shown in FIG. 11. Referring to FIG. 13, this program includes a step 540 of executing a process 542 target text.

The process 542 includes: a step 550 of reading a target text; a step 552 of performing morphological analysis and dependency analysis on the text; a step 554 of preparing an array having elements corresponding to respective morphemes; a step 556 of executing the following process 558 and thereby counting, for each morpheme of the target text, the summaries including that morpheme, and storing the count in the corresponding array element; and a step 560 of outputting the array including the counts at step 556 in association with the target text in which dependency analysis is performed.

The process 558 includes a step 570 of executing a process 572 on a marked portion of summaries created manually. The process 572 includes a step 580 of executing a process 582 on each morpheme of the target text. In the process 582, each element corresponding to each morpheme is implemented. Specifically, by this process 582, the number of summaries in which each morpheme is used is counted.

Figure 14:
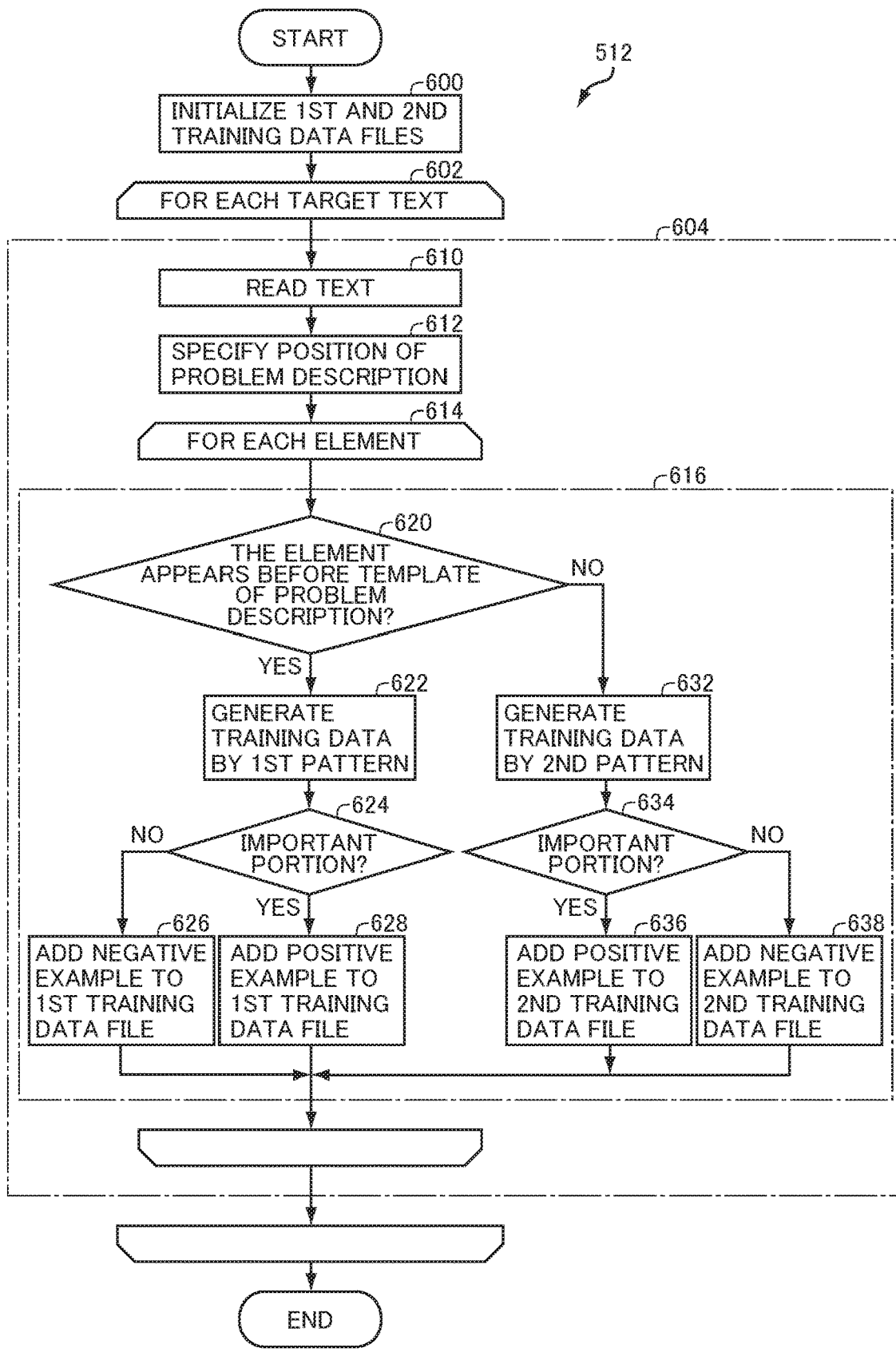
FIG. 14 is a flowchart representing a control structure of a computer program realizing the training data generating unit shown in FIG. 11.

FIG. 14 is a flowchart representing a control structure of a computer program realizing the training data generating unit 512 shown in FIG. 11. Referring to FIG. 14, this program includes: a step 600 of initializing first and second training data files stored in the first and second training data storage devices 514 and 516, respectively; and a step 602 of executing the following process 604 for each marked target text.

The process 604 includes: a step 610 of reading a target summary text of processing; a step 612 of specifying a position of problem description in the read text; and a step 614 of executing the following process 616 on each element other than the problem description.

The process 616 includes: a step 620 of determining whether or not an element to be processed exists before the predicate of predicate template in the problem description; a step 622, executed if the determination at step 620 is positive (that is, if the element is positioned before the predicate of problem description), of generating the training data from the first pattern; a step 624 of determining whether or not the element to be processed is marked as an important portion; a step 628, executed if the determination at step 624 is positive (that is, if the element is marked as an important portion), of adding the training data as a positive example to the first training data file; and a step 626, executed if the determination at step 624 is negative (if it is not marked as an important portion), of adding the training data as a negative example to the first training data file.

The process 616 further includes: a step 632, executed if the determination at step 620 is negative (if the element is after the predicate of problem description), of generating the training data by the second pattern; a step 634 of determining whether or not the element to be processed is marked as an important portion; a step 636, executed if the determination at step 634 is positive (if it is marked as an important portion), of adding the training data as a positive example to the second training data file; and a step 638, executed if the determination at step 634 is negative (if it is not marked as an important portion), of adding the training data as a negative example to the second training data file.

Figure 15:
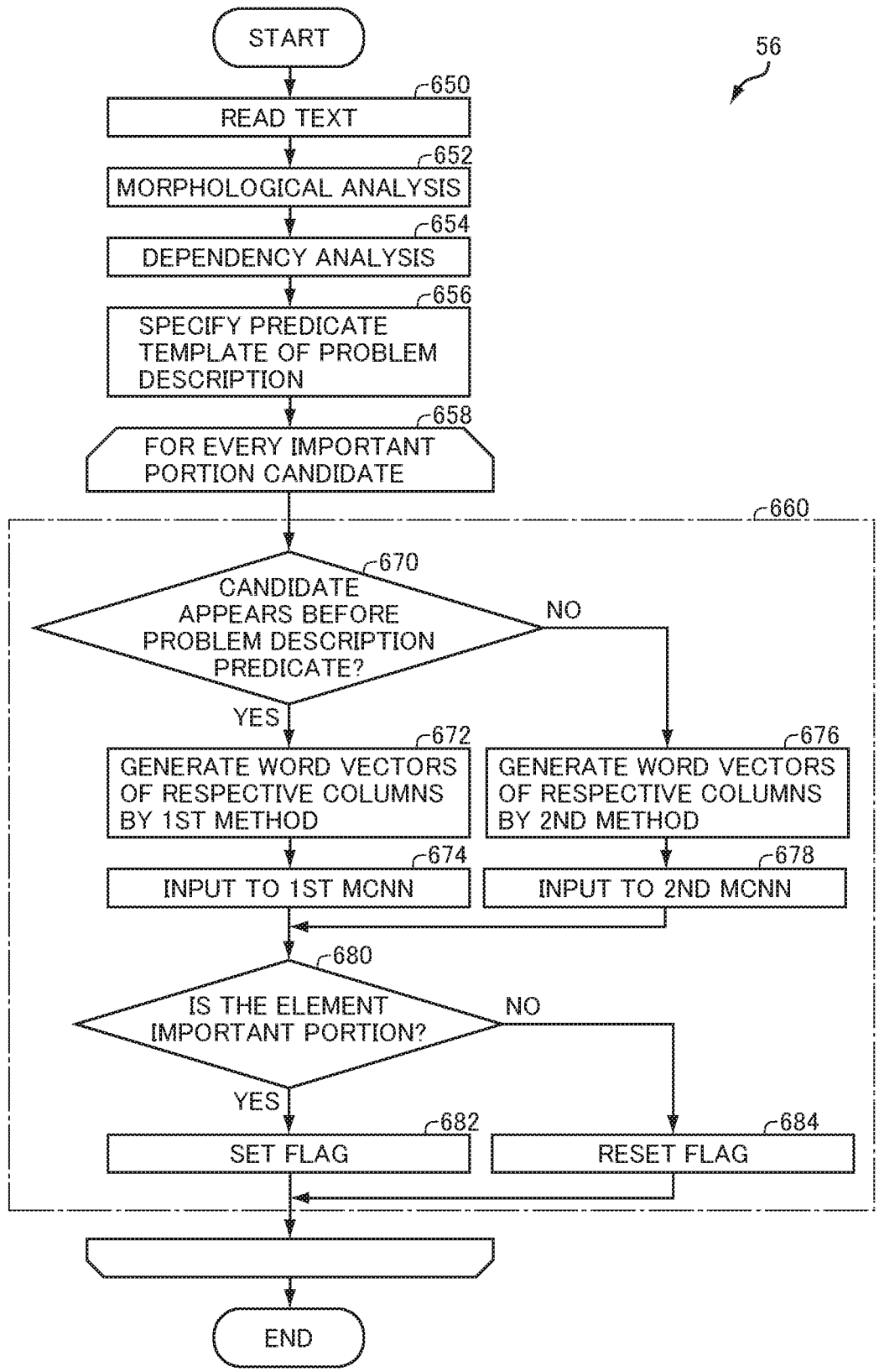
FIG. 15 is a flowchart representing a control structure of a computer program realizing the important portion extractor shown in FIG. 1.

FIG. 15 is a flowchart representing a control structure of a computer program realizing the important portion extractor 56 shown in FIG. 1. Referring to FIG. 15, this program includes: a step 650 of reading a target text to be summarized; a step 652 of performing morphological analysis on the read text; a step 654 of performing dependency analysis of the text based on the result of morphological analysis; a step 656 of specifying a predicate template of a portion marked as a problem description portion in the text; and a step 658 of taking content words in the text as candidates of important portions and executing a process 660 on each of the candidates.

The process 660 includes: a step 670 of determining whether or not the candidate to be processed is positioned before the predicate in the problem description and branching the flow of control depending on the result; a step 672, executed if the determination at step 670 is positive (if the candidate to be processed is positioned before the predicate of problem description), of generating, from the input text, word vector sequences as inputs to respective columns of MCNN by the first method; a step 674 of inputting the word vector sequences generated at step 672 to MCNN of the first important portion detector 520 and obtaining the result of determination; a step 676, executed if the determination at step 670 is negative (if the candidate to be processed is positioned after the predicate of problem description), of generating, from the input text, word vector sequences as inputs to respective columns of MCNN by the second method; and a step 678 of inputting the word vector sequences generated at step 676 to the MCNN of second important portion detector 524 and obtaining the result of determination.

The process 660 further includes: a step 680 of determining, as a result of step 674 or 678, whether or not the element that is being processed by MCNN is determined to be an important portion and branching the flow of control; a step 682, executed if the result of step 680 is positive (if it is a proper important portion), of setting a flag of the element that is being processed and ending the process 660; and a step 684, executed if the determination at step 680 is negative (if it is not a proper important portion), of resetting the flag of the element that is being processed, and ending the process 660.

Figure 16:
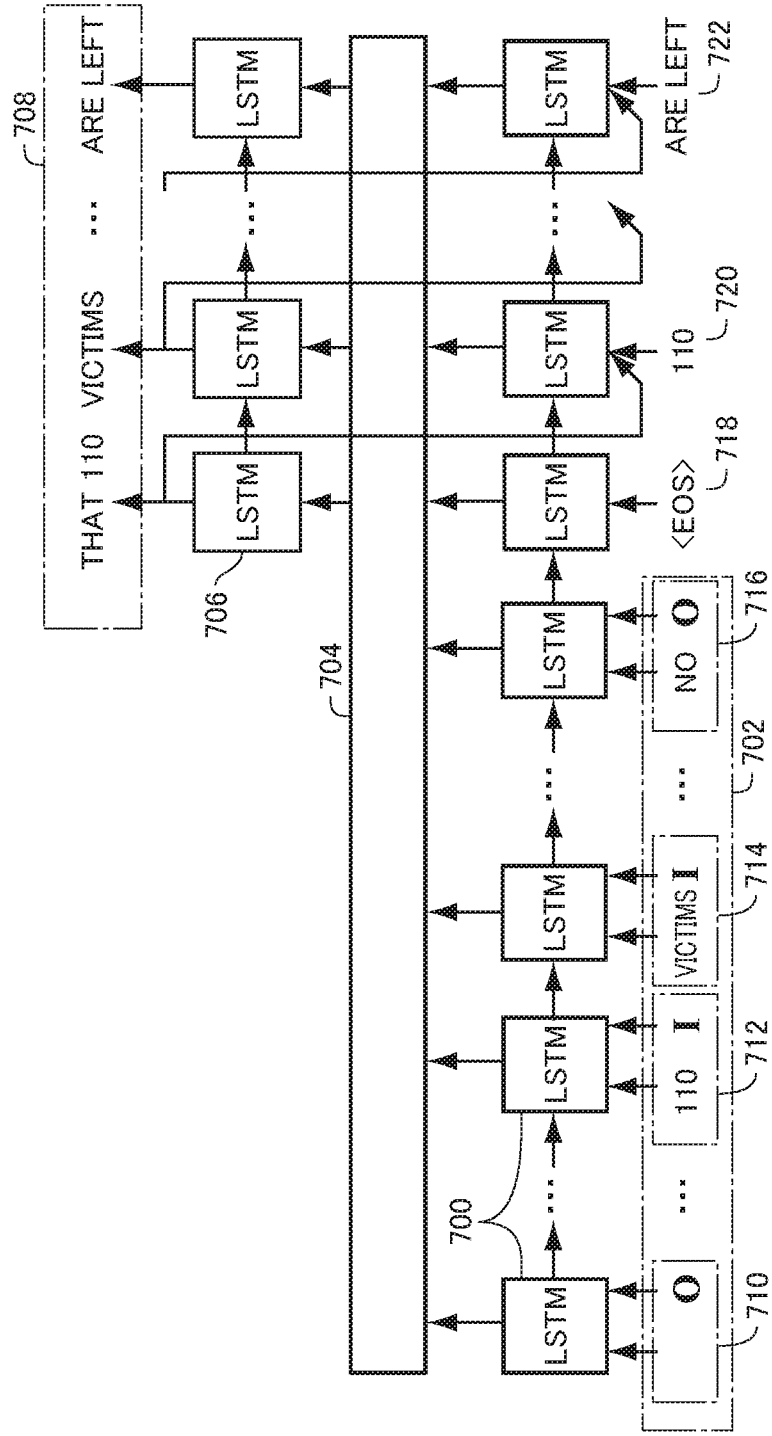
FIG. 16 is a schematic illustration showing an architecture and operations at the time of training and summarizing, of a long short-term memory as a type of recurrent neural network realizing the summarizer shown in FIG. 1.

FIG. 16 is a schematic illustration of summarizer 62 shown in FIG. 1. Referring to FIG. 16, summarizer 62 includes: an LSTM 700, which is a type of recurrent neural network, forming an input layer; an attention layer 704 connected to receive an output from LSTM 700; and an LSTM 706 connected to receive an output from attention layer 704. LSTM has been used in machine translation, automatic summarization and so on, of which basic configuration and operation are described in detail in, for example, Minh-Thang Luong, Hieu Pham, Christopher D. Manning. Effective Approaches to Attention-based Neural Machine Translation. Proceedings of the 2015 Conference on Empirical Methods in Natural Language Processing, pages 1412-1421, Lisbon, Portugal, 17-21 Sep. 2015. The LSTM in summarizer 62 is basically the same as one described in this article. It is noted, however, that in summarizer 62 of the present embodiment, to each word vector input to the LSTM, a flag indicating whether or not the word is an important portion or problem description is added.

FIG. 16 shows an operation of LSTM at the time of generating a summary, while the operation of LSTM during training is the same up to halfway. Specifically, at the time of training, respective word vectors of word vector sequences of word sequences forming the target text 702 are applied to LSTM 700 in a prescribed order, and LSTM 700, attention layer 704 and LSTM 706 are trained. In the example shown in FIG. 16, word vectors 710, 712, 714, ... 716 of respective words forming the target text 702 are applied to LSTM 700 in this order. At this time, as a last element of the word vector, a flag is added, of which value is 1 if the word is an important portion or a problem description, and 0 otherwise. Any value that indicates whether the word is an important portion or not may be selected as the value of this element. As to the order of applying the word vectors, it is a common practice to apply them in a normal order during training and to apply them in a reverse order at the time of summarizing. We adopt this approach here.

When input of word vectors including all words of the target text 702 and the flags is complete, a value "<EOS>" indicating the end of input is input to LSTM 700. At this time, LSTM 700, attention layer 704 and LSTM 706 are trained such that the first word of manually created summary is obtained at the output of LSTM 706.

Thereafter, different from FIG. 16, at the time of training, word vectors of respective words of manually created summaries are input to LSTM 700 in order, and LSTM 700, attention layer 704 and LSTM 706 are trained. LSTM 700, attention layer 704 and LSTM 706 are trained such that "<EOS>" is obtained at the output of LSTM 706 when the input of respective word vectors of manually created summaries to LSTM 700 is completed.

The operation at the time of summarization is partially different from that at the time of training. During summarization process, the target text 702 is input to summarizer 62 in the same manner as during training. It has been known, however, that the order of inputting words may be reversed when generating a summary. When input of the target text up to its end is completed, a vector 718 indicating "<EOS>" is input to LSTM 700. The word output from LSTM 706 in response to vector 718 is the first word of the summary. Then, the word obtained as an output of LSTM 706 is given to LSTM 700 as an input 720. The word obtained at the output of LSTM 706 in response is the second word of the summary. Then, the process of applying the output of LSTM 706 as an input 722 of LSTM 700 is repeated in the similar manner. When "<EOS>" is obtained at the output of LSTM 706 in response to the input to LSTM 700, the process ends. The word sequence 708 obtained as outputs of LSTM 706 during this operation is the summary of input target text 702.

Figure 17:
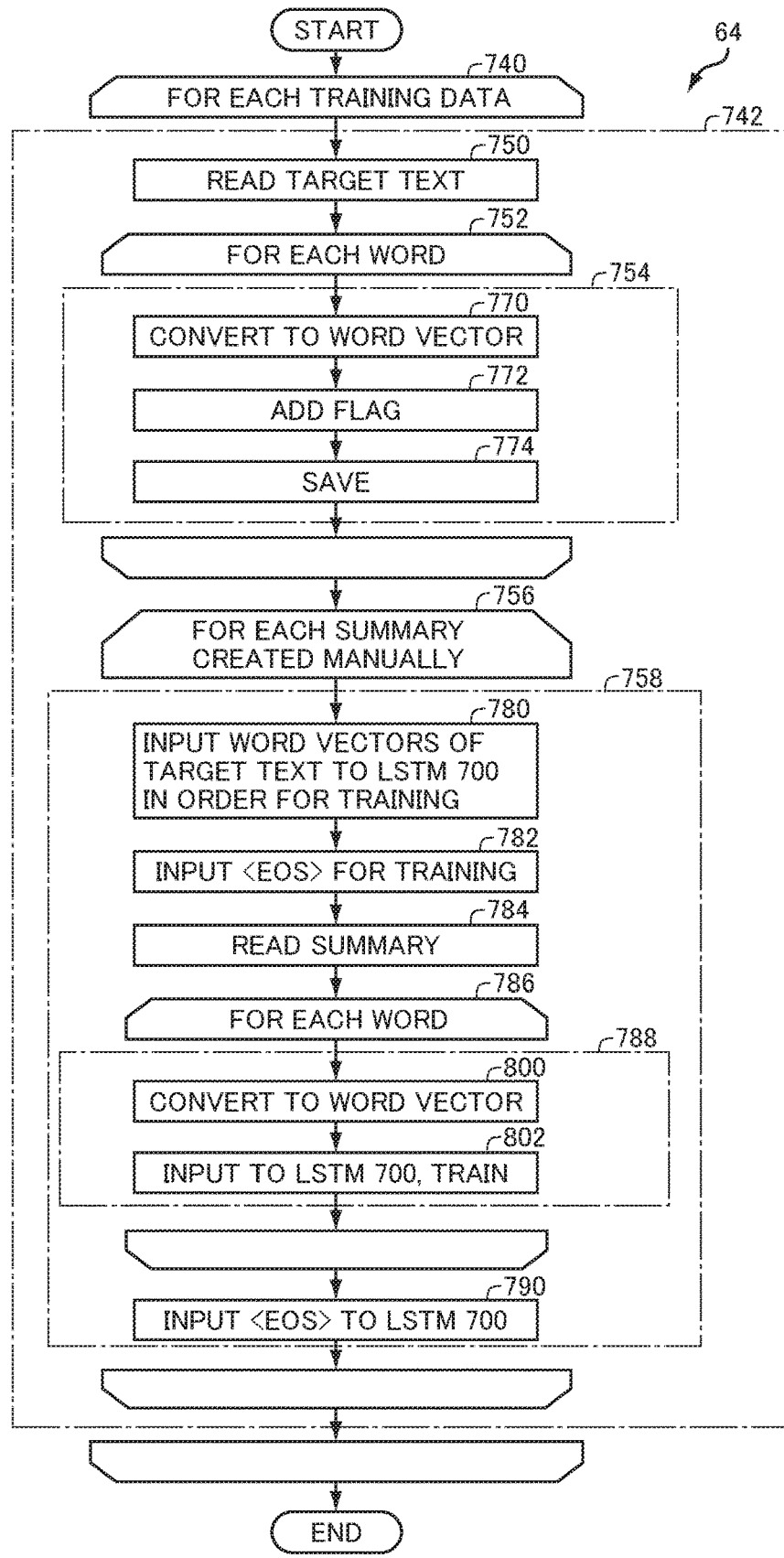
FIG. 17 is a flowchart representing a control structure of a computer program realizing the summarizer LSTM training unit shown in FIG. 1.

FIG. 17 is a flowchart representing a control structure of a computer program realizing the summarizer LSTM training unit 64, for training the summarizer LSTM substantially implementing summarizer 62. Referring to FIG. 17, the program includes a step 740 of executing a process 742 on all training data, for training the LSTM using the training data.

The process 742 includes: a step 750 of reading the target text from a storage device; a step 752 of executing a process 754 of converting each word forming the target text to a word vector and storing it in a storage device; and a step 756 of executing a process 758 of training LSTM using each of the summaries (three in this embodiment) manually created for the target text.

The process 754 includes: a step 770 of converting a target word as an object of processing to a word vector; a step 772 of adding, at the end of the word vector, a new element of one-dimensional random vector that assumes a first value if the word is an important word or a word of a problem description portion and a second value different from the first value otherwise, as a flag; and a step 774 of adding the thus converted word vector next to a word vector that corresponds to the immediately preceding word and saving it in a storage device.

The process 758 includes: a step 780 of reading word vector sequences stored in the storage device by the process 754, and inputting them to LSTM 700 in order so as to train summarizer 62; a step 782 of inputting, after all the word vectors are input to LSTM 700, a word vector that represents <EOS> to LSTM 700 to train summarizer 62; a step 784 of reading from the storage device each of the manually created summaries of the target; a step 786 of executing a process 788 of converting each word included in the summary to word vectors and successively inputting them to LSTM 700; and a step 790 of inputting <EOS> indicating the end of the summary to LSTM 700.

The process 788 includes: a step 800 of converting a target word to a word vector; and a step 802 of inputting the word vector to LSTM 700 and training summarizer 62.

Figure 18:
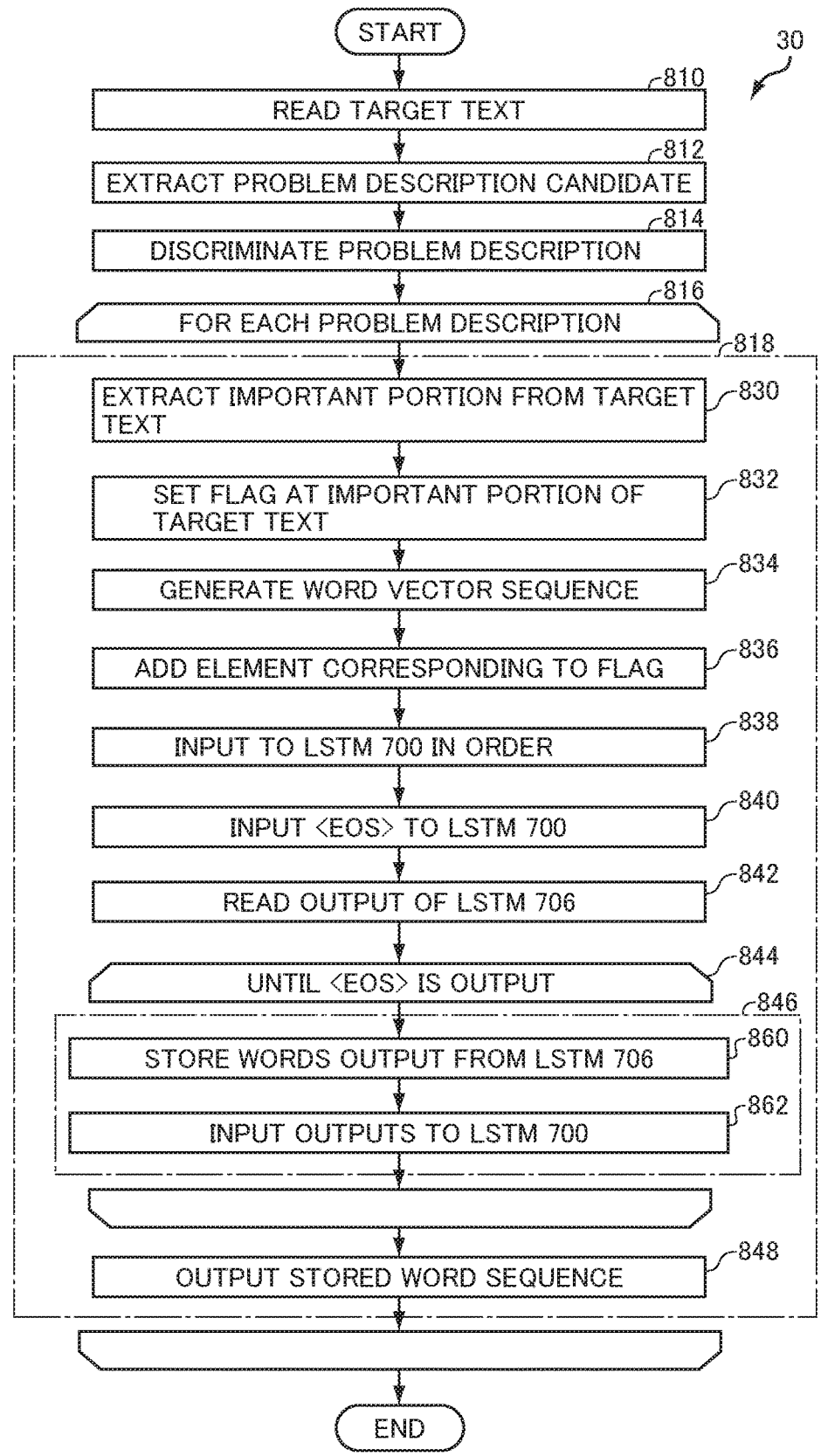
FIG. 18 is a flowchart representing a control structure of a computer program realizing the summarizer shown in FIG. 1.

FIG. 18 is a flowchart representing a control structure of a computer program realizing the text summarizing system 30 shown in FIG. 1 that generates a summary of the target text using summarizer 62 trained in the above-described manner. Referring to FIG. 18, the program includes: a step 810 of reading a target text from a storage device; a step 812 of extracting a problem description candidate by executing the process (FIG. 2) that corresponds to problem description candidate extractor 46 shown in FIG. 1 on the target text; a step 814 of determining whether or not the problem description candidate extracted at step 812 is a proper problem description by executing the process (FIG. 10) that corresponds to problem description discriminator 50 shown in FIG. 1; and a step 816 of executing, on each of the portions discriminated to be a proper problem description at step 814, a process 818 of generating a summary.

The process 818 includes: a step 830 of extracting, from the target text, an important portion by the process that corresponds to important portion extractor 56 (see FIG. 1); a step 832 of setting a flag on the extracted important portion; a step 834 of generating word vector sequences by converting each word of the target text to a word vector; and a step 836 of adding an element that assumes 1 if the word is an important portion or a problem description and 0 if not, to each of the generated word vector.

The process 818 further includes: a step 838 of inputting the word vector sequences generated at steps 834 and 836 to LSTM 700 in order; a step 840 of inputting, after all the word vectors are input to LSTM 700 at step 838, <EOS> to LSTM 700; a step 842 of reading the output of LSTM 706 at this time; a step 844 of executing a process 846 of storing word sequences output from LSTM 706 thereafter until <EOS> is output from LSTM 706; and a step 848, responsive to the output of <EOS> from LSTM 706 ending step 844, of outputting the word sequence stored by the process 846 as a summary of the target text.

The process 846 includes: a step 860 of adding and storing a word output from LSTM 706 to the end of the word sequence formed so far; and a step 862 of applying, as an input to LSTM 700, the word output from LSTM 706 at step 860.

<Operation>

The text summarizing system 30 having the above-described configuration operates in the following manner. Text summarizing system 30 operates roughly in two operation phases. The first is a training phase and the second is a summarizing phase.

<Training Phase>

The training phase is further divided into three. The first is training of problem description discriminator 50, the second is training of important portion extractor 56, and the third is training of summarizer 62.

—Training of Problem Description Discriminator 50—

Problem description discriminator 50 is trained in the following manner. Referring to FIG. 3, first, training texts are stored in text set storage device 130, and noun polarity dictionary 132 and template polarity dictionary 134 are prepared. Problem description candidate extractor 140 reads each text in text set storage device 130, finds candidates of problem description in the text with reference to noun polarity dictionary 132 and template polarity dictionary 134, and extracts a problem description candidate containing three sentences preceding and succeeding the portion of interest, as will be described below.

Specifically, referring to FIG. 2, a computer program realizing problem description candidate extractor 46 reads a target text from a storage device (step 90), and divides the read text into sentences using punctuation points (step 92). Then, for each sentence of the target text, a process 98 of searching for a problem description candidate is executed (step 96).

In the process 98, the text is subjected to morphological analysis (step 110) and dependency analysis (step 112). Thereafter, in the dependency-parsed text, a product of polarities of each combination of a noun and a predicate template having a dependency relation is calculated with reference to noun polarity dictionary 42 and template polarity dictionary 44 (step 114). If there is any negative product (positive at step 116), three sentences, including the sentence of negative product and preceding and succeeding sentences, are output as a candidate of target text (step 118). By executing this process 98 for each text, a plurality of problem description candidates is obtained.

Again referring to FIG. 3, the problem description candidates obtained in this manner are stored in problem description candidate storage device 142. These problem description candidates are manually checked and classified to proper and improper problem descriptions (classification process 144). The proper problem description portions are stored in positive example storage device 146 and others are stored in negative example storage device 148.

Training data generating unit 150 generates training data for problem description discriminator 50 from the positive and negative examples stored in positive example storage device 146 and negative example storage device 148. The generated training data are stored in training data storage device 152. Training unit 154 trains MCNN of problem description discriminator 50 using the training data.

Referring to FIG. 4, controller 160 of training data generating unit 150 switches selector 162 such that when a positive example is processed, the output of positive example storage device 146 is connected to the input of text reader 164 and when a negative example is processed, the output of negative example storage device 148 is connected to the input of text reader 164. Text reader 164 reads texts one by one in order from the positive example storage device 146 or the negative example storage device 148 through selector 162. Morphological analysis unit 166 performs morphological analysis on the read text, dependency analysis unit 168 performs dependency analysis on the text, and outputs an analyzed sentence 170 having dependency information added.

First to eleventh word sequence generators 172 generate eleven word sequences that correspond to respective columns of MCNN (see FIG. 3) of problem description discriminator 50, and apply these to word vector converter 174. Word vector converter 174 converts each of the words forming these eleven word sequences to a word vector, and applies the generated eleven word vector sequences to flag adding unit 176. Flag adding unit 176 receives a signal output from controller 160 to control selector 162, and using its value, adds a flag indicating that the training data is a positive example or a negative example, to the training data formed of the eleven word vector sequences. Training data output unit 178 stores the training data obtained in this manner in training data storage device 152.

When training data are generated for all positive examples stored in positive example storage device 146 and all negative examples stored in negative example storage device 148, preparation of training data by training data generating unit 150 ends.

The eleven word vector sequences generated by the first to eleventh word sequence generators 172 are as described above with reference to FIGS. 5 to 7.

Referring to FIG. 8, the first word vector sequence of each training data is given to the first column of convolutional neural network group 360 of MCNN 214 implementing problem description discriminator 50. The second to fourth word vector sequences are respectively given to three sub-networks of convolutional neural network group 362 of the second column of MCNN 214. The fifth to eighth word vector sequences are respectively given to four sub-networks of convolutional neural network group 364 of the third column. The ninth to eleventh word vector sequences are respectively applied to three sub-networks of convolutional neural network group 366 of the fourth column. Training of MCNN 214 is realized by error back propagation as in a common neural network.

—Training of Important Portion Extractor 56—

For the purpose of training important portion extractor 56 shown in FIG. 1 by important portion extractor MCNN training unit 58 shown in FIG. 11, referring to FIG. 11, first, a plurality of target texts is collected and stored in target text storage device 500. Each of these target texts is summarized by a plurality of annotators (three in this embodiment) (manual summarization 502). The created summaries are stored in association with the target texts in summary storage device 504. Here, summarization is done under certain constraints as described above.

Important portion selecting unit 506 selects, as an important portion, a word that is commonly included in at least two of the three summaries for each target text. Target text marking unit 508 marks the word selected by important portion selecting unit 506 as an important portion and outputs a marked target text. The marked target texts output from target text marking unit 508 are stored in marked target text storage device 510. Training data generating unit 512 reads marked target text from marked target text storage device 510, generates training data in accordance with the positional relation between the important portion and the predicate template in the problem description in the text, and outputs the training data either to the first training data storage device 514 or to the second training data storage device 516. If the important portion or its candidate CAND appears before PRED in the target text, TNP in Table 1 is replaced by CAND (first method). If PRED appears before CAND, in Table 1, the positions of CAND and PRED are switched (second method). Here, training data is generated treating the portions where the important word or words are used in the target text 530 as positive examples and using other portions as negative examples.

First training unit 518 trains MCNN of important portion detector 520 using the training data stored in the first training data storage device 514. Second training unit 522 trains MCNN of important portion detector 524 using the training data stored in the second training data storage device 516.

—Training of Summarizer 62—

Referring to FIG. 17, the process for training the summarizer LSTM implementing the essential part of summarizer 62 (corresponding to summarizer LSTM training unit 64) is as follows. Before this process, it is necessary that target texts and three summaries manually created for each target text are stored in the storage device. A flag distinguishing a problem description portion and an important portion from other portions is added to each word of each target text.

First, the process 742 is executed for each training data. In the process 742, the target text is read from the storage device (step 750), and the process 754 of converting each word forming the target text to a word vector and storing in the storage device is executed (step 752). Thereafter, the process 758 of training LSTM using each of the manually created summaries for the target text is executed (step 756).

In the process 754, the target word to be processed is converted to a word vector (step 770), and a new element as a flag that assumes a first value if the word is an important word or a word of a problem description portion and a second value otherwise is added to the end of the word vector (step 772). The thus converted word vector is added next to a word vector that corresponds to the immediately preceding word and saved in a storage device (step 774).

In the process 758, word vector sequences stored in the storage device by the process 754 are read and input to LSTM 700 in order so as to train summarizer 62 (step 780). After all the word vectors are input to LSTM 700, a word vector that represents <EOS> is input to LSTM 700 to train summarizer 62 (step 782). Thereafter, the manually created summary of the target is read from the storage device (step 784), and in the process 788, each word included in the summary is converted to a word vector and input to LSTM 700 in order (step 786). When the input of summary ends, <EOS> indicating the end is input to LSTM 700 (step 790).

In the process 788, target words are converted to word vectors (step 800) and the word vectors are input to LSTM 700 in order so as to train summarizer 62 (step 802).

Through the above-described process steps, training of problem description discriminator 50, important portion extractor 56 and summarizer 62 is finished, and text summarizing system 30 is ready to produce summaries.

<Summarizing Phase>

Referring to FIG. 1, target texts to be summarized are stored in text set storage device 40, and noun polarity dictionary 42 and template polarity dictionary 44 are prepared beforehand. From each sentence stored in text set storage device 40, problem description candidate extractor 46 extracts a candidate of problem description with reference to noun polarity dictionary 42 and template polarity dictionary 44, extracts three sentences including the sentence including a problem description candidate and preceding and succeeding sentences, as a candidate of target text, and stores it in a problem description candidate storage device 48.

Problem description discriminator 50 discriminates whether or not the problem description portion of each target text candidate stored in problem description candidate storage device 48 is a proper problem description, stores only the proper ones as target texts in target text storage device 54, and discards other candidates.

For each word in each target text stored in target text storage device 54, important portion extractor 56 discriminates whether the word is an important portion or not, using two types of important portion extracting MCNNs in accordance with a relation between the word and the problem description, and if a word is an important portion, marks the word as an important portion and outputs it to marked target text storage device 60.

Summarizer 62 converts each word of the marked target texts stored in marked target text storage device 60 to word vectors, adds a flag to each word vector indicating whether or not the word is an important portion or a problem description, inputs the flagged vectors to LSTM 700 of summarizer 62 in order, and finally, inputs a word vector representing <EOS> to LSTM 700. Further, summarizer 62 stores the word output from LSTM 706 at this time and uses it as an input to LSTM 700. The word output from LSTM 706 in response to this input is additionally stored, and further input to LSTM 700. Summarizer 62 repeats such an operation until <EOS> is output from LSTM 706. When <EOS> is output, the word sequence output from LSTM 706 by that time is output as a summary of the target text as the object of processing.

Summarizer 62 repeats the above-described operation for each target text stored in marked target text storage device 60.

[Computer Implementation]

Figure 19:
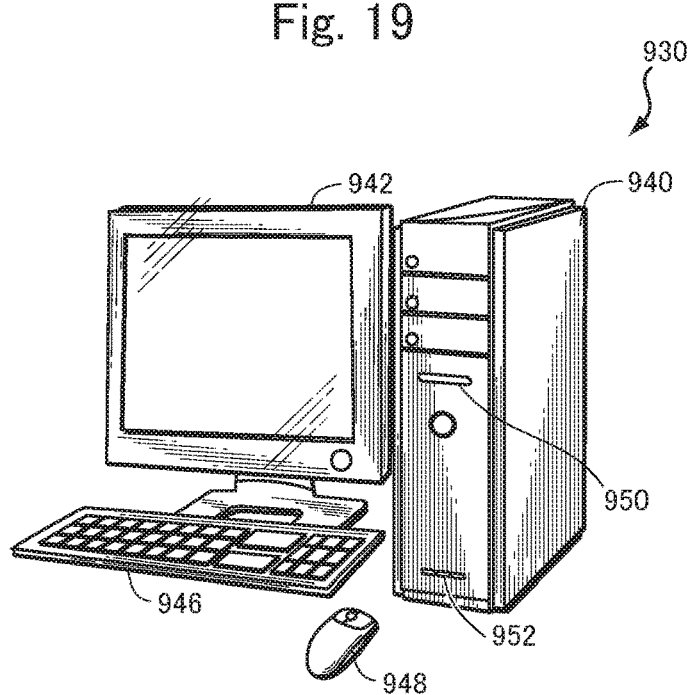
FIG. 19 shows an appearance of a computer system realizing the text summarizing system 30 in accordance with the embodiment of the present invention.

The summarizing system and its various components in accordance with the embodiment described above can be implemented by computer hardware and computer programs executed on the computer hardware. FIG. 19 shows an appearance of computer system 930 and FIG. 20 shows an internal configuration of computer system 930.

Referring to FIG. 19, computer system 930 includes a computer 940 having a memory port 952 and a DVD (Digital Versatile Disk) drive 950, a keyboard 946, a mouse 948, and a monitor 942.

Figure 20:
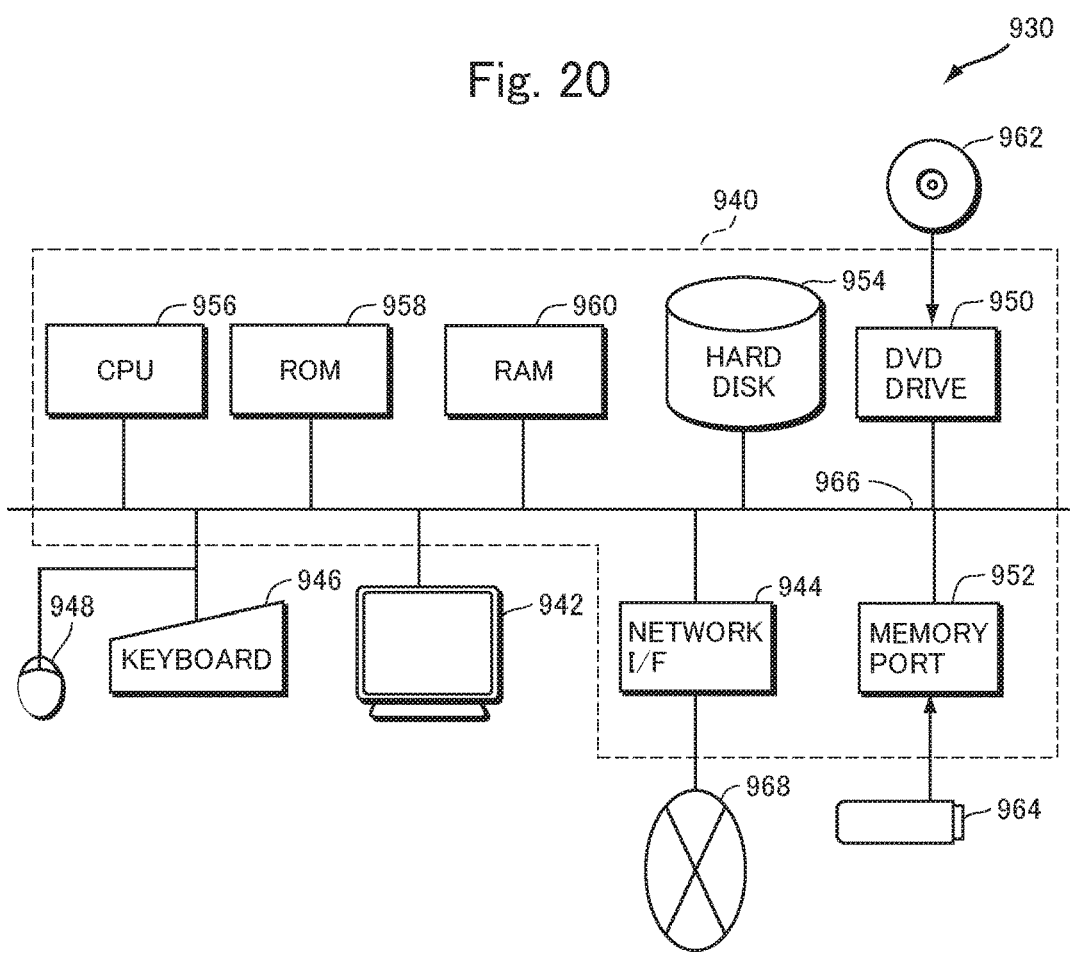
FIG. 20 is a block diagram showing an internal hardware configuration of the computer system of which appearance is shown in FIG. 19.

Referring to FIG. 20, computer 940 includes, in addition to memory port 952 and DVD drive 950, a CPU (Central Processing Unit) 956, a bus 966 connected to CPU 956, memory port 952 and DVD drive 950, a read-only memory (ROM) 958 storing a boot-up program and the like, and a random access memory (RAM) 960 connected to bus 966, for storing program instructions, a system program and work data. Computer system 930 further includes a network interface (I/F) 944 providing a connection to a network allowing communication with another terminal. Network I/F 944 may be connected to the Internet 968.

The computer program causing computer system 930 to function as the summarizing system in accordance with the embodiment above or each of its functioning sections is stored in a DVD 962 or a removable memory 964 loaded to DVD drive 950 or to memory port 952, and transferred to hard disk 954. Alternatively, the program may be transmitted to computer 940 through a network I/F 944 and stored in hard disk 954. At the time of execution, the program is loaded to RAM 960. The program may be directly loaded from DVD 962, removable memory 964 or through network I/F 944 to RAM 960.

The program includes a plurality of instructions to cause computer 940 to operate as the summarizing system or its functioning sections in accordance with the embodiment above. Some of the basic functions necessary to realize the operation are provided by the operating system (OS) running on computer 940, by a third party program, or by a module of various programming tool kits installed in computer 940. Therefore, the program may not necessarily include all of the functions necessary to realize the summarizing system in accordance with the present embodiment. The program has only to include instructions to realize the functions of the above-described summarizing system or its functioning sections by calling appropriate functions or appropriate program tools in a program tool kit in a manner controlled to attain desired results. The operation of computer system 930 is well known and, therefore, description thereof will not be given here.

The texts such as the target texts are stored in hard disk 954 and developed on RAM 960 appropriately in the embodiment above. Model parameters and the like for MCNNs and LSTMs are all stored in RAM 960. Eventually optimized model parameters and the like are stored from RAM 960 to hard disk 954, DVD 962 or removable memory 964. Alternatively, model parameters may be transmitted through network I/F 944 to another device or received from another device.

Effects of the Embodiment

By the text summarizing system 30 in accordance with the above-described embodiment, when a summary is to be generated from a target text, a portion of problem description and an important portion with respect to the problem description in the target text are specified, and input as word vectors having flags distinguished from other words to the LSTM. As a result, a summary is generated from a viewpoint related to the problem description included in the target text and, hence, a summary can be generated that represents the contents of the text better than the conventional approach.

In the embodiment above, MCNN is used in each of problem description discriminator 50 and important portion extractor 56. The present invention, however, is not limited to such an embodiment. It is possible to use an SVM, LSTM or the like other than MCNN. Further, in the embodiment above, a noun polarity dictionary and a template polarity dictionary are used to extract candidates of portions where problems are described as descriptions to be focused on. Here, the noun polarity is determined from a viewpoint of whether the noun is a so-called trouble noun or not. The present invention, however, is not limited to such an embodiment. The polarity of a noun may be determined by any attribute of the noun of interest.

According to another aspect, the present invention provides an important portion extracting device for extracting a description to be focused on, which is a portion of description to be focused on from a certain viewpoint in the target text. The device includes: a noun polarity dictionary recording, for each of a plurality of nouns, a polarity viewed from a certain point; a template polarity dictionary recording, for a predicate template that forms a phrase when combined with a noun, its polarity viewed from a point of whether or not it promotes the function or effect of the object represented by the noun combined with the predicate; a candidate extracting means for determining, for each combination of a noun and a predicate template combined in an input text, polarity of the combination with reference to the noun polarity dictionary and the template polarity dictionary, and extracting a combination having a polarity satisfying a prescribed condition as a candidate of description to be focused on together with its context information; a word vector sequence generating means for generating, for each of the candidates of the description to be focused on extracted by the candidate extracting means, a plurality of different word vector sequences through a plurality of methods based on the context information of the candidates; and a description to be focused on score calculating means trained in advance such that it outputs, in response to an input of a word vector sequence generated by the word vector sequence generating means, a score indicating a degree of the candidate of the description to be focused on corresponding to the word vector sequence being a proper description to be focused on.

According to a still further aspect, the present invention provides an important portion detecting device including: a text storage device storing target texts with a description to be focused on in which the portion describing an important element is marked; and a detecting means for detecting a portion that is important in relation to the description to be focused on, from the target texts stored in the text storage device. The detecting device includes: a word vector sequence generating means for generating, for each of word sequences satisfying a prescribed condition in the target texts, a plurality of word vector sequences generated by a plurality of methods based on contexts of the word sequence; a score calculating means trained in advance such that it outputs, in response to an input of a word vector sequence generated by the word vector sequence generating means, a score indicating a degree of the word sequence corresponding to the word vector sequence being an important portion in relation to the description to be focused on; and an important portion marking means for marking the word sequence in the word sequences having the highest score calculated by the score calculating means as being important in relation to the description to be focused on.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is usable in various aspects of so called artificial intelligence applications, for example, to automatically detect legal, economical, technical or scientific problems by focusing on specific elements described in sentences, and to present solutions or answers to such problems.

REFERENCE SIGNS LIST

30 text summarizing system
42, 132 noun polarity dictionary
44, 134 template polarity dictionary
46, 140 problem description candidate extractor
50 problem description discriminator
52 problem description discriminator MCNN training unit
56 important portion extractor
58 important portion extractor MCNN training unit
60, 510 marked target text storage device
62 summarizer
64 summarizer LSTM training unit
130 text set storage device
144 manual classification process
150, 512 training data generating unit
152, 514, 516 training data storage device
160 controller
164 text reader
166 morphological analysis unit
168 dependency analysis unit 170 analyzed sentence
172 1st to 11th word sequence generators
174 word vector converter
176 flag adding unit
178 training data output unit
214 MCNN
504 summary storage device
506 important portion selecting unit
508 target text marking unit
518, 522 training unit
520, 524 important portion detector
540, 702 target text
700, 706 LSTM
704 attention layer
708 word sequence

The invention claimed is:

1. A summary generating apparatus generating a summary of text, comprising:
   a memory configured to store the text with information indicating a portion to be focused on in the text;
   a processor configured to:
   analyze the text to determine the portion to be focused on in the text including:
      receiving target text of the text;
      performing morphological analysis on the received target text;
      performing dependency analysis of the target text based on the result of the morphological analysis;
      identifying a problem description portion of the target text based on the dependency analysis of the target text;
      specifying a predicate template of the problem description portion identifying content words in the target text as candidate important portions;
      for each candidate important portion:
         determining if the candidate important portion is positioned before a predicate in the problem description portion;
         when the candidate important portion is positioned before the predicate in the problem description portion:
            generating word vector sequences including word vectors from the candidate important portion by a first method;
            inputting the generated word vector sequences into a first method neural network trained to identify important portions;
            for each of the word vectors, adding an element indicating whether or not the word vector is the portion to be focused on based on whether the first method neural network identifies the word vector as an important portion;
         when the candidate important portion is not positioned before the predicate in the problem description portion;
            generating the word vector sequences including the word vectors from the candidate important portion by a second method;
            inputting the generated word vector sequences into a second method neural network trained to identify the important portions;
            for each of the word vectors, adding the element indicating whether or not the word vector is the portion to be focused on based on whether the second method neural network identifies the word vector as an important portion;
   perform sequence-to-sequence type conversion by implementing a converting neural network trained beforehand by machine learning such that it outputs, in response to input of each of the word vectors of the word vector sequence in a prescribed order, a summary of the text consisting of words represented by the word vector sequence; and
   input each of the word vectors of the converted word vector sequence to the converting neural network in the prescribed order.

2. The summary generating apparatus according to claim 1, wherein the memory is configured to store, together with the text, information indicating a plurality of the portions to be focused on of the text.

3. The summary generating apparatus according to claim 1, wherein the converting neural network is a recurrent neural network.

4. The summary generating apparatus according to claim 3, wherein the converting neural network is LSTM.

5. A summary generating method of generating a summary of text using a computer having a processor and memory, the method comprising the computer performing the steps of:
   storing in the memory the text with information indicating a portion to be focused on in the text in a text storage device;
   analyzing the text to determine the portion to be focused on in the text including:
      receiving target text of the text;
      performing morphological analysis on the received target text;
      performing dependency analysis of the target text based on the result of the morphological analysis;
      identifying a problem description portion of the target text based on the dependency analysis of the target text;
      specifying a predicate template of the problem description portion
      identifying content words in the target text as candidate important portions;
      for each candidate important portion:
         determining if the candidate important portion is positioned before a predicate in the problem description portion;
         when the candidate important portion is positioned before the predicate in the problem description portion:
            generating word vector sequences including word vectors from the candidate important portion by a first method;
            inputting the generated word vector sequences into a first method neural network trained to identify important portions;
            for each of the word vectors, adding an element indicating whether or not the word vector is the portion to be focused on based on whether the first method neural network identifies the word vector as an important portion;
         when the candidate important portion is not positioned before the predicate in the problem description portion:
            generating the word vector sequences including the word vectors from the candidate important portion by a second method;
            inputting the generated word vector sequences into a second method neural network trained to identify the important portions;

for each of the word vectors, adding the element indicating whether or not the word vector is the portion to be focused on based on whether the second method neural network identifies the word vector as an important portion;

performing sequence-to-sequence type conversion by it a converting neural network trained beforehand by machine learning such that it outputs, in response to input of each of the word vectors of the word vector sequence in a prescribed order, a summary of the text consisting of words represented by the word vector sequence; and inputting each of the word vectors of the converted word vector sequence to the converting neural network in the prescribed order, and obtaining a word sequence output by the converting neural network in response to the input, as a summary of the text.

6. A non-transitory computer readable medium comprising a computer program stored thereon which, when executed, makes a processor of a computer execute the summary generating method according to claim 5.

* * * * *